United States Patent
Cirriez et al.

(10) Patent No.: US 11,952,444 B2
(45) Date of Patent: Apr. 9, 2024

(54) POLYETHYLENE RESINS

(71) Applicant: TOTAL RESEARCH & TECHNOLOGY FELUY, Seneffe (BE)

(72) Inventors: Virginie Cirriez, Waterloo (BE); Alexandre Welle, Court-St-Etienne (BE); Aurélien Vantomme, Mignault (BE); Pierre Bernard, Mont-sur-Marchienne (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 519 days.

(21) Appl. No.: 17/285,526

(22) PCT Filed: Oct. 14, 2019

(86) PCT No.: PCT/EP2019/077829
§ 371 (c)(1),
(2) Date: Apr. 15, 2021

(87) PCT Pub. No.: WO2020/078932
PCT Pub. Date: Apr. 23, 2020

(65) Prior Publication Data
US 2021/0388133 A1   Dec. 16, 2021

(30) Foreign Application Priority Data
Oct. 15, 2018   (EP) .................... 18200380

(51) Int. Cl.
| C08L 23/08 | (2006.01) |
| C07F 17/00 | (2006.01) |
| C08F 4/659 | (2006.01) |
| C08F 4/6592 | (2006.01) |
| C08F 210/16 | (2006.01) |

(52) U.S. Cl.
CPC ............ *C08F 210/16* (2013.01); *C07F 17/00* (2013.01); *C08F 4/65912* (2013.01); *C08F 4/65916* (2013.01); *C08F 4/65927* (2013.01); *C08L 23/0815* (2013.01)

(58) Field of Classification Search
CPC .......................... C08L 23/0815; C08F 210/16; C08F 4/65904; C08F 4/65927
See application file for complete search history.

(56) References Cited

U.S. PATENT DOCUMENTS

2017/0320978 A1   11/2017   Jeong et al.
2019/0284317 A1*   9/2019   Kwon ................. C08F 4/65904

FOREIGN PATENT DOCUMENTS

| EP | 2931763 A1 | 10/2015 |
| WO | 2008/113680 A1 | 9/2008 |
| WO | 2019025528 A1 | 2/2019 |

OTHER PUBLICATIONS

G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, No. 4, 1977, p. 773-778.
Y.D Zhang et al, "13C NMR, GPC, and DCS Study on a Propylene-ethylene-1-butene Terpolymer Fractionated by Termperature Rising Elution Fractionation" Polymer Journal, vol. 35, No. 7, 2003, p. 551-559.
International Search Report issued in Application No. PCT/EP2019/077829, dated Dec. 13, 2019, 3 pages.
A. Ortin et al., "Characterization of Chemical Composition along the Molar Mass Distribution in Polyolefin Copolymers by GPC Using a Modern Filter-Based IR Detector"; Macromol. Symp., (2013), vol. 330, pp. 63-80.
T. Frijns-Bruls et al., "Studies on the Application of Filter-Based IR Detector for Polyolefin Characterization with HT-SEC"; Macromol. Symp., (2015), vol. 356, pp. 87-94.
Bernd Peifer et al., "Selbstimmobilisierende Metallocenkatalysatoren"; Journal of Organometallic Chemistry, (1998), vol. 553, pp. 205-220.
Plastics Additives Handbook, ed. H. Zweifel, 5th edition, Hanser Publishers.

* cited by examiner

*Primary Examiner* — Caixia Lu
(74) *Attorney, Agent, or Firm* — Amster, Rothstein & Ebenstein LLP

(57) ABSTRACT

The present invention relates to a polyethylene resin prepared using a continuous process having and at least one metallocene catalyst composition:
  a molecular weight distribution $M_w/M_n$ lower than 6.5;
  a molecular weight distribution $M_w/M_n$ of at least 3.5;
  a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg;
  melt index ratio $HLMI/MI_2$ below or equal to 30; and
  a melt strength of X in Newtons, as determined by Göttfert Rheotens Melt Strength Apparatus, 190° C., as described in the Experimental section, satisfying the following equations (1) and/or (2)

X is greater than $-0.026 \ln(MI_2)+0.0498$   (1)

X is greater than $-0.026 \ln(HLMI)+0.1334$   (2)

with $M_w$ being the weight-average molecular weight and $M_n$ being the number-average molecular weight.
The present invention also relates to articles comprising said polyethylene resin as well as process for preparing said resin.

15 Claims, 2 Drawing Sheets

POLYETHYLENE RESINS

CROSS-REFERENCE TO RELATED APPLICATIONS

This application claims the benefit of PCT/EP2019/077829 filed Oct. 14, 2019, which claims priority from EP 18200380.6 filed Oct. 15, 2018, which is incorporated herein by reference in its entirety for all purposes.

FIELD OF INVENTION

This invention relates to new polyethylene resins and to articles comprising said polyethylene resins.

BACKGROUND OF THE INVENTION

In the field of polyethylene, constant mechanical properties improvement is mandatory. Good melt processing of polyethylene is generally associated among others with high melt strength and low extruder head pressure.

There are many types of polyethylene resins. Not many of them however combine processing-ease, good mechanical properties.

Single-site metallocene-produced polyethylene resins are known to have excellent optical and mechanical properties but poor processing. Addition of processing aids is often required for extrusion grades having a melt flow index $MI_2$ of less than 6 g/10 min.

Processing may be improved by several well-known methods: broadening the molecular weight distribution, adding processing aids, ionizing or extruding with peroxides or controlled amount of oxygen. Aside from the added cost, numerous side effects are usually encountered, such as for example increase of gel content, worsening of mechanical properties, development of color and odors.

There is thus still a need for resins that can be processed easily and offer simultaneously good mechanical properties.

SUMMARY OF THE INVENTION

It is therefore an object of the present invention to provide new polyethylene resins that have good melt strength and which can be easily processed.

In a first aspect, the present invention provides a polyethylene resin prepared using a continuous process, and at least one metallocene catalyst composition, said polyethylene resin having a molecular weight distribution $M_w/M_n$ lower than 6.5;
a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg; and
a melt strength of X in Newtons, as determined by Göttfert Rheotens Melt Strength Apparatus, 190° C., as described in the Experimental section, satisfying the following equations (1) and/or (2)

X is greater than −0.026 ln($MI_2$)+0.0498      (1)

X is greater than −0.026 ln(HLMI)+0.1334      (2)

with $M_w$ being the weight-average molecular weight and $M_n$ being the number-average molecular weight.

Preferably, the polyethylene resin is prepared using a continuous process, and using at least one metallocene catalyst composition, said polyethylene resin having a molecular weight distribution $M_w/M_n$ lower than 6.5;
a molecular weight distribution $M_w/M_n$ of at least 3.5;
a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg;
a melt index ratio HLMI/$MI_2$ (also referred as $MI_{21}/MI_2$) below or equal to 30; and
a melt strength of X in Newtons, as determined by Göttfert Rheotens Melt Strength Apparatus, 190° C., as described in the Experimental section, satisfying the following equations (1) and/or (2)

X is greater than −0.026 ln($MI_2$)+0.0498      (1)

X is greater than −0.026 ln(HLMI)+0.1334      (2)

with $M_w$ being the weight-average molecular weight and $M_n$ being the number-average molecular weight.

In a second aspect, the present invention also encompasses an article comprising the polyethylene resin according to the first aspect.

In a third aspect, the present invention provides a continuous process for the preparation of a polyethylene resin according to the first aspect, the process comprising: contacting at least one metallocene catalyst composition with ethylene, optionally hydrogen, and optionally one or more alpha-olefin co-monomers; and polymerizing the ethylene, and the optionally one or more alpha-olefin co-monomers, in the presence of said at least one metallocene catalyst composition, and optional hydrogen, thereby obtaining the polyethylene resin.

The invention overcomes the drawbacks of the aforementioned strategies. The present invention provides polyethylene resins having broad molecular weight distributions, ideal co-monomer incorporation and improved processing and mechanical properties. After the polyethylene resin is produced, it may be formed into various articles, including but not limited to, film products, caps and closures, yarns such a grass yarns, rotomoulded products, blow moulded products, pipe, etc. The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other features or statements indicated as being preferred or advantageous.

DETAILED DESCRIPTION OF THE INVENTION

Figure 1:
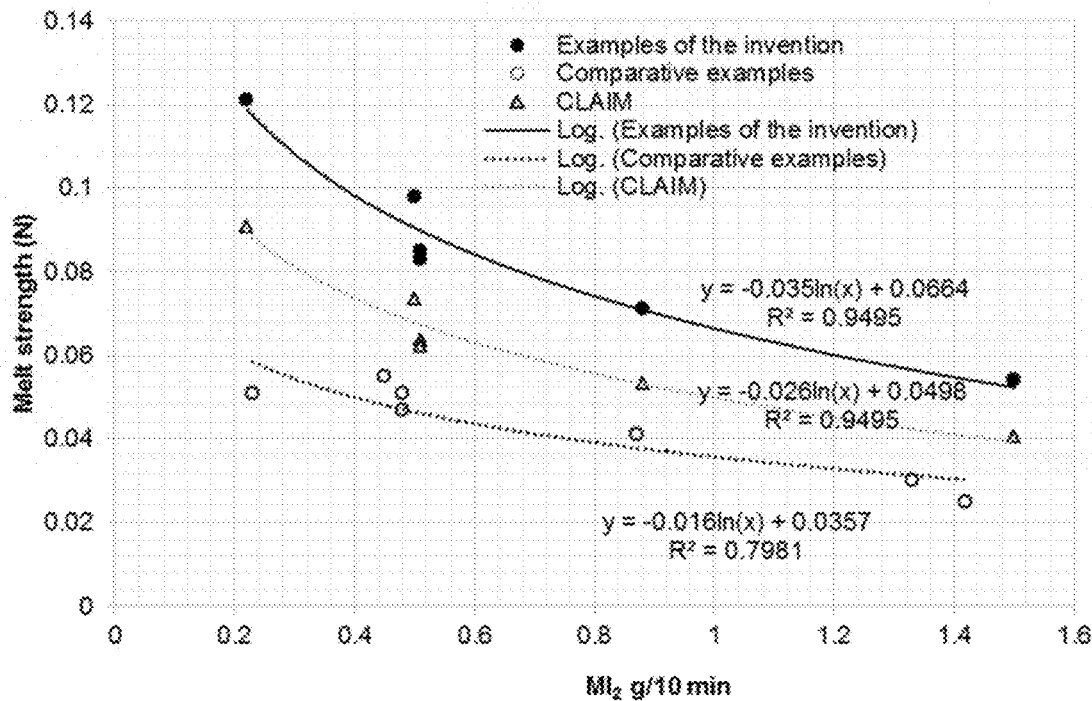
FIG. 1 represents a graph plotting the melt strength of several polyethylene resins as a function of the melt index $MI_2$.

Before the present resins, processes, articles, and uses encompassed by the invention are described, it is to be understood that this invention is not limited to particular resins, processes, articles, and uses described, as such resins, processes, articles, and uses may, of course, vary. It is also to be understood that the terminology used herein is not intended to be limiting, since the scope of the present invention will be limited only by the appended claims.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. When describing the compounds, processes, articles, and uses of the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Whenever the term "substituted" is used herein, it is meant to indicate that one or more hydrogen atoms on the atom indicated in the expression using "substituted" is replaced with a selection from the indicated group, provided that the indicated atom's normal valence is not exceeded, and that the substitution results in a chemically stable compound, i.e. a compound that is sufficiently robust to survive isolation from a reaction mixture. Preferred substituents for the indenyl, tetrahydroindenyl, cyclopentadienyl and fluorenyl groups, can be selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl. Preferably, substituents for the tetrahydroindenyl, cyclopentadienyl and fluorenyl groups, can be selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl. The term "halo" or "halogen" as a group or part of a group is generic for fluoro, chloro, bromo, iodo.

The term "alkyl" as a group or part of a group, refers to a hydrocarbyl group of formula $C_nH_{2n+1}$ wherein n is a number greater than or equal to 1. Alkyl groups may be linear or branched and may be substituted as indicated herein. Generally, alkyl groups of this invention comprise from 1 to 20 carbon atoms, preferably from 1 to 10 carbon atoms, preferably from 1 to 6 carbon atoms, more preferably from 1 to 4 carbon atoms. When a subscript is used herein following a carbon atom, the subscript refers to the number of carbon atoms that the named group may contain. For example, the term "$C_{1-20}$alkyl", as a group or part of a group, refers to a hydrocarbyl group of formula —$C_nH_{2n+1}$ wherein n is a number ranging from 1 to 20. Thus, for example, "$C_{1-8}$alkyl" includes all linear or branched alkyl groups with between 1 and 8 carbon atoms, and thus includes methyl, ethyl, n-propyl, i-propyl, butyl and its isomers (e.g. n-butyl, i-butyl and t-butyl); pentyl and its isomers, hexyl and its isomers, etc. A "substituted alkyl" refers to an alkyl group substituted with one or more substituent(s) (for example 1 to 3 substituent(s), for example 1, 2, or 3 substituent(s)) at any available point of attachment.

When the suffix "ene" is used in conjunction with an alkyl group, i.e. "alkylene", this is intended to mean the alkyl group as defined herein having two single bonds as points of attachment to other groups. As used herein, the term "alkylene" also referred as "alkanediyl", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH(CH_3)$—$CH_2$—), 3-methylpropylene (—$CH_2$—$CH_2$—$CH(CH_3)$—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers.

The term "alkenyl" as a group or part of a group, refers to an unsaturated hydrocarbyl group, which may be linear, or branched, comprising one or more carbon-carbon double bonds. Generally, alkenyl groups of this invention comprise from 3 to 20 carbon atoms, preferably from 3 to 10 carbon atoms, preferably from 3 to 8 carbon atoms. When a subscript is used herein following a carbon atom, the subscript refers to the number of carbon atoms that the named group may contain. Examples of $C_{3-20}$alkenyl groups are ethenyl, 2-propenyl, 2-butenyl, 3-butenyl, 2-pentenyl and its isomers, 2-hexenyl and its isomers, 2,4-pentadienyl, and the like. The term "alkoxy" or "alkyloxy", as a group or part of a group, refers to a group having the formula —$OR^b$ wherein $R^b$ is alkyl as defined herein above. Non-limiting examples of suitable alkoxy include methoxy, ethoxy, propoxy, isopropoxy, butoxy, isobutoxy, sec-butoxy, tert-butoxy, pentyloxy and hexyloxy.

The term "cycloalkyl", as a group or part of a group, refers to a cyclic alkyl group, that is a monovalent, saturated, hydrocarbyl group having 1 or more cyclic structure, and comprising from 3 to 20 carbon atoms, more preferably from 3 to 10 carbon atoms, more preferably from 3 to 8 carbon atoms; more preferably from 3 to 6 carbon atoms. Cycloalkyl includes all saturated hydrocarbon groups containing 1 or more rings, including monocyclic, bicyclic groups or tricyclic. The further rings of multi-ring cycloalkyls may be either fused, bridged and/or joined through one or more Spiro atoms. When a subscript is used herein following a carbon atom, the subscript refers to the number of carbon atoms that the named group may contain. For example, the term "$C_{3-20}$cycloalkyl", a cyclic alkyl group comprising from 3 to 20 carbon atoms. For example, the term "$C_{3-10}$cycloalkyl", a cyclic alkyl group comprising from 3 to 10 carbon atoms. For example, the term "$C_{3-8}$cycloalkyl", a cyclic alkyl group comprising from 3 to 8 carbon atoms. For example, the term "$C_{3-6}$cycloalkyl", a cyclic alkyl group comprising from 3 to 6 carbon atoms. Examples of $C_{3-12}$cycloalkyl groups include but are not limited to adamantly, cyclopropyl, cyclobutyl, cyclopentyl, cyclohexyl, cycloheptyl, cyclooctyl, bicycle[2.2.1]heptan-2yl, (1S,4R)-norbornan-2-yl, (1R,4R)-norbornan-2-yl, (1S,4S)-norbornan-2-yl, (1R,4S)-norbornan-2-yl.

When the suffix "ene" is used in conjunction with a cycloalkyl group, i.e. cycloalkylene, this is intended to mean the cycloalkyl group as defined herein having two single bonds as points of attachment to other groups. Non-limiting examples of "cycloalkylene" include 1,2-cyclopropylene, 1,1-cyclopropylene, 1,1-cyclobutylene, 1,2-cyclobutylene, 1,3-cyclopentylene, 1,1-cyclopentylene, and 1,4-cyclohexylene.

Where an alkylene or cycloalkylene group is present, connectivity to the molecular structure of which it forms part may be through a common carbon atom or different carbon atom. To illustrate this applying the asterisk nomenclature of this invention, a $C_3$alkylene group may be for example *—$CH_2CH_2CH_2$—*, *—CH(—$CH_2CH_3$)—* or *—$CH_2CH$(—$CH_3$)—*. Likewise a $C_3$cycloalkylene group may be

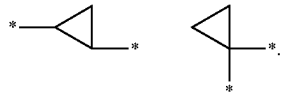

The term "cycloalkenyl" as a group or part of a group, refers to a non-aromatic cyclic alkenyl group, with at least one site (usually 1 to 3, preferably 1) of unsaturation, namely a carbon-carbon, sp2 double bond; preferably having from 5 to 20 carbon atoms more preferably from 5 to 10 carbon atoms, more preferably from 5 to 8 carbon atoms, more preferably from 5 to 6 carbon atoms. Cycloalkenyl includes all unsaturated hydrocarbon groups containing 1 or more rings, including monocyclic, bicyclic or tricyclic groups.

The further rings may be either fused, bridged and/or joined through one or more Spiro atoms. When a subscript is used herein following a carbon atom, the subscript refers to the number of carbon atoms that the named group may contain. For example, the term "$C_{5-20}$cycloalkenyl", a cyclic alkenyl group comprising from 5 to 20 carbon atoms. For example, the term "$C_{5-10}$cycloalkenyl", a cyclic alkenyl group comprising from 5 to 10 carbon atoms. For example, the term "$C_{5-8}$cycloalkenyl", a cyclic alkenyl group comprising from 5 to 8 carbon atoms. For example, the term "$C_{5-6}$cycloalkyl", a cyclic alkenyl group comprising from 5 to 6 carbon atoms. Examples include, but are not limited to: cyclopentenyl (—$C_5H_7$), cyclopentenylpropylene, methylcyclohexenylene and cyclohexenyl (—$C_6H_9$). The double bond may be in the cis or trans configuration.

The term "cycloalkenylalkyl", as a group or part of a group, means an alkyl as defined herein, wherein at least one hydrogen atom is replaced by at least one cycloalkenyl as defined herein.

The term "cycloalkoxy", as a group or part of a group, refers to a group having the formula —$OR^h$ wherein $R^h$ is cycloalkyl as defined herein above.

The term "aryl", as a group or part of a group, refers to a polyunsaturated, aromatic hydrocarbyl group having a single ring (i.e. phenyl) or multiple aromatic rings fused together (e.g. naphthyl), or linked covalently, typically containing 6 to 20 atoms; preferably 6 to 10, wherein at least one ring is aromatic. The aromatic ring may optionally include one to two additional rings (either cycloalkyl, heterocyclyl or heteroaryl) fused thereto. Examples of suitable aryl include $C_{6-20}$aryl, preferably $C_{6-10}$aryl, more preferably $C_{6-8}$aryl. Non-limiting examples of aryl comprise phenyl, biphenylyl, biphenylenyl, or 1- or 2-naphthanelyl; 1-, 2-, 3-, 4-, 5- or 6-tetralinyl (also known as "1,2,3,4-tetrahydronaphtalene); 1-, 2-, 3-, 4-, 5-, 6-, 7- or 8-azulenyl, 4-, 5-, 6 or 7-indenyl; 4- or 5-indanyl; 5-, 6-, 7- or 8-tetrahydronaphthyl; 1,2,3,4-tetrahydronaphthyl; and 1,4-dihydronaphthyl; 1-, 2-, 3-, 4- or 5-pyrenyl. A "substituted aryl" refers to an aryl group having one or more substituent(s) (for example 1, 2 or 3 substituent(s), or 1 to 2 substituent(s)), at any available point of attachment.

The term "aryloxy", as a group or part of a group, refers to a group having the formula —$OR^g$ wherein $R^g$ is aryl as defined herein above.

The term "arylalkyl", as a group or part of a group, means an alkyl as defined herein, wherein at least one hydrogen atom is replaced by at least one aryl as defined herein. Non-limiting examples of arylalkyl group include benzyl, phenethyl, dibenzylmethyl, methylphenylmethyl, 3-(2-naphthyl)-butyl, and the like.

The term "alkylaryl" as a group or part of a group, means an aryl as defined herein wherein at least one hydrogen atom is replaced by at least one alkyl as defined herein. Non-limiting example of alkylaryl group include p-$CH_3$—$R^g$—, wherein $R^g$ is aryl as defined herein above. The term "arylalkyloxy" or "aralkoxy" as a group or part of a group, refers to a group having the formula —O—$R^a$—$R^g$ wherein $R^g$ is aryl, and $R^a$ is alkylene as defined herein above.

The term "heteroalkyl" as a group or part of a group, refers to an acyclic alkyl wherein one or more carbon atoms are replaced by at least one heteroatom selected from the group comprising O, Si, S, B, and P, with the proviso that said chain may not contain two adjacent heteroatoms. This means that one or more —$CH_3$ of said acyclic alkyl can be replaced by —OH for example and/or that one or more —$CR_2$— of said acyclic alkyl can be replaced by O, Si, S, B, and P.

The term "aminoalkyl" as a group or part of a group, refers to the group —$R^j$—$NR^kR^l$ wherein $R^j$ is alkylene, $R^k$ is hydrogen or alkyl as defined herein, and $R^l$ is hydrogen or alkyl as defined herein.

The term "heterocyclyl" as a group or part of a group, refers to non-aromatic, fully saturated or partially unsaturated cyclic groups (for example, 3 to 7 member monocyclic, 7 to 11 member bicyclic, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from N, S, Si, Ge, where the nitrogen and sulfur heteroatoms may optionally be oxidized and the nitrogen heteroatoms may optionally be quaternized. The heterocyclic group may be attached at any heteroatom or carbon atom of the ring or ring system, where valence allows. The rings of multi-ring heterocycles may be fused, bridged and/or joined through one or more spiro atoms.

Non limiting exemplary heterocyclic groups include aziridinyl, oxiranyl, thiiranyl, piperidinyl, azetidinyl, 2-imidazolinyl, pyrazolidinyl imidazolidinyl, isoxazolinyl, oxazolidinyl, isoxazolidinyl, thiazolidinyl, isothiazolidinyl, piperidinyl, succinimidyl, 3H-indolyl, indolinyl, isoindolinyl, 2H-pyrrolyl, 1-pyrrolinyl, 2-pyrrolinyl, 3-pyrrolinyl, pyrrolidinyl, 4H-quinolizinyl, 2-oxopiperazinyl, piperazinyl, homopiperazinyl, 2-pyrazolinyl, 3-pyrazolinyl, tetrahydro-2H-pyranyl, 2H-pyranyl, 4H-pyranyl, 3,4-dihydro-2H-pyranyl, oxetanyl, thietanyl, 3-dioxolanyl, 1,4-dioxanyl, 2,5-dioximidazolidinyl, 2-oxopiperidinyl, 2-oxopyrrolodinyl, indolinyl, tetrahydropyranyl, tetrahydrofuranyl, tetrahydrothiophenyl, tetrahydroquinolinyl, tetrahydroisoquinolin-1-yl, tetrahydroisoquinolin-2-yl, tetrahydroisoquinolin-3-yl, tetrahydroisoquinolin-4-yl, thiomorpholin-4-yl, thiomorpholin-4-ylsulfoxide, thiomorpholin-4-ylsulfone, 1,3-dioxolanyl, 1,4-oxathianyl, 1,4-dithianyl, 1,3,5-trioxanyl, 1H-pyrrolizinyl, tetrahydro-1,1-dioxothiophenyl, N-formylpiperazinyl, and morpholin-4-yl.

Whenever used in the present invention the term "compounds" or a similar term is meant to include the compounds of general formula (I) and/or (II) and any subgroup thereof, including all polymorphs and crystal habits thereof, and isomers thereof (including optical, geometric and tautomeric isomers) as hereinafter defined.

The compounds of formula (I) and/or (II) or any subgroups thereof may comprise alkenyl group, and the geometric cis/trans (or Z/E) isomers are encompassed herein. Where structural isomers are interconvertible via a low energy barrier, tautomeric isomerism ('tautomerism') can occur. This can take the form of proton tautomerism in compounds of formula (I) containing, for example, a keto group, or so-called valence tautomerism in compounds which contain an aromatic moiety. It follows that a single compound may exhibit more than one type of isomerism.

Cis/trans isomers may be separated by conventional techniques well known to those skilled in the art, for example, chromatography and fractional crystallization.

Preferred statements (features) and embodiments of the compositions, processes, polymers, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered statements and embodiments, with any other aspect and/or embodiment.

1. A polyethylene resin prepared using a continuous process and at least one metallocene catalyst composition, said polyethylene resin having:
   a molecular weight distribution $M_w/M_n$ lower than 6.5;
   a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg; and
   a melt strength of X in Newtons, as determined by Göttfert Rheotens Melt Strength Apparatus, 190° C., as described in the Experimental section, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334 \quad (2)$$

with $M_w$ being the weight-average molecular weight and $M_n$ being the number-average molecular weight.

2. The polyethylene resin according to statement 1, wherein the polyethylene resin has a melt index ratio $HLMI/MI_2$ (also referred as $MI_{21}/MI_2$) below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30.

3. A polyethylene resin according to any one of statements 1-2, or a polyethylene resin per se, prepared using a continuous process and using at least one metallocene catalyst composition, said polyethylene resin having:
   a molecular weight distribution $M_w/M_n$ lower than 6.5;
   a molecular weight distribution $M_w/M_n$ of at least 3.5;
   a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg;
   a melt index ratio $HLMI/MI_2$ below or equal to 30; and
   a melt strength of X in Newtons, as determined by Göttfert Rheotens Melt Strength Apparatus, 190° C., as described in the Experimental section, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334 \quad (2)$$

with $M_w$ being the weight-average molecular weight and $M_n$ being the number-average molecular weight.

4. The polyethylene resin according to any one of statements 1-4, wherein the polyethylene resin has a melt index ratio $HLMI/MI_2$ of above 15, preferably above 16, more preferably above 17, for example above 18, for example above 19, for example above 20, preferably the $HLMI/MI_2$ ratio is from 15 to 30, preferably from 16 to 30, preferably from 17 to 30, for example from 18 to 30, for example from 19 to 30, for example from 20 to 30.

5. The polyethylene resin according to any one of statements 1-4, wherein the polyethylene resin has a molecular weight distribution $M_z/M_n$ of at least 8.0 preferably a $M_z/M_n$ of at least 8.5, preferably a $M_z/M_n$ of at least 9.0, with $M_z$ being the z average molecular weight and $M_n$ being the number-average molecular weight.
6. The polyethylene resin according to any one of statements 1-5, wherein the polyethylene resin has a molecular weight distribution $M_z/M_w$ lower than 3.5, with $M_z$ being the z average molecular weight, preferably a $M_z/M_w$ lower than 3.0.
7. The polyethylene resin according to any one of statements 1-6, wherein said polyethylene resin has a molecular weight distribution $M_w/M_n$ of at least 3.0, preferably at least 3.3, preferably a $M_w/M_n$ of at least 3.5, preferably a $M_w/M_n$ of at least 3.6, preferably a $M_w/M_n$ of at least 3.7, preferably a $M_w/M_n$ of at least 3.8.
8. The polyethylene resin according to any one of statements 1-7, wherein said polyethylene resin has a molecular weight distribution $M_w/M_n$ of at most 6.4, preferably a $M_w/M_n$ of at most 6.0, preferably a $M_w/M_n$ of at most 5.5, preferably a $M_w/M_n$ of at most 5.3, preferably a $M_w/M_n$ of at most 5.0.
9. The polyethylene resin according to any one of statements 1-8, wherein said polyethylene resin has a melt index $MI_2$ ranging from 0.10 to 6.0 g/10 min, preferably from 0.15 to 4.5 g/10 min, preferably 0.20 to 4.0 g/10 min, preferably from 0.20 to 3.5 g/10 min, preferably from 0.20 to 3.0 g/10 min, preferably from 0.20 to 2.5 g/10 min, as determined according to ISO 1133:1997 at a temperature of 190° C. and under a load of 2.16 kg.
10. The polyethylene resin according to any one of statements 1-9, wherein said polyethylene resin has a melt index $MI_2$ ranging from 0.10 to 6.0 g/10 min, preferably from 0.15 to 4.5 g/10 min, preferably 0.20 to 4.0 g/10 min, preferably from 0.20 to 3.5 g/10 min, preferably from 0.20 to 3.0 g/10 min, preferably from 0.20 to 2.5 g/10 min, as determined according to ISO 1133:1997 at a temperature of 190° C. and under a load of 2.16 kg; and a melt strength of X in Newtons, as determined by Göttfert Rheotens Melt Strength Apparatus, 190° C., as described in the Experimental section, satisfying the following equation (1)

$$X \text{ is greater than } -0.026 \ln(MI_2)+0.0498 \tag{1}.$$

11. The polyethylene resin according to any one of statements 1-10, wherein said polyethylene resin has a melt index HLMI ranging from 2.4 to 150 g/10 min, preferably from 3.0 to 110 g/10 min, preferably 4.0 to 95.0 g/10 min, preferably from 5.0 to 80.0 g/10 min, preferably from 5.0 to 70.0 g/10 min, preferably from 5.0 to 60.0 g/10 min, as determined according to ISO 1133:1997, at a temperature of 190° C. and under a load of 21.6 kg; and
a melt strength of X in Newtons, as determined by Göttfert Rheotens Melt Strength Apparatus, 190° C., as described in the Experimental section, satisfying the following equation (2)

$$X \text{ is greater than } -0.026 \ln(HLMI)+0.1334 \tag{2}$$

12. The polyethylene resin according to any one of statements 1-11, wherein said polyethylene resin has a melt index $MI_2$ ranging from 0.10 to 6.0 g/10 min, preferably from 0.15 to 4.5 g/10 min, preferably 0.20 to 4.0 g/10 min, preferably from 0.20 to 3.5 g/10 min, preferably from 0.20 to 3.0 g/10 min, preferably from 0.20 to 2.5 g/10 min, as determined according to ISO 1133:1997 at a temperature of 190° C. and under a load of 2.16 kg; and a melt strength of X in Newtons, as determined by Göttfeft Rheotens Melt Strength Apparatus, 190° C., as described in the Experimental section, satisfying the following equation (1)

$$X \text{ is greater than } -0.026 \ln(MI_2)+0.0498 \tag{1};$$

and
a molecular weight distribution $M_z/M_w$ lower than 3.5, with $M_z$ being the z average molecular weight; preferably lower than 3.0.
13. The polyethylene resin according to any one of statements 1-12, wherein said polyethylene resin has a melt index HLMI ranging from 2.4 to 150 g/10 min, preferably from 3.0 to 110 g/10 min, preferably 4.0 to 95.0 g/10 min, preferably from 5.0 to 80.0 g/10 min, preferably from 5.0 to 70.0 g/10 min, preferably from 5.0 to 60.0 g/10 min, as determined according to ISO 1133:1997, at a temperature of 190° C. and under a load of 21.6 kg; and
a melt strength of X in Newtons, as determined by Göttfert Rheotens Melt Strength Apparatus, 190° C., as described in the Experimental section, satisfying the following equation (2)

$$X \text{ is greater than } -0.026 \ln(HLMI)+0.1334; \tag{2}$$

a molecular weight distribution $M_z/M_w$ lower than 3.5, with $M_z$ being the z average molecular weight; preferably lower than 3.0.
14. The polyethylene resin according to any one of statements 1-13, wherein said polyethylene resin has a melt index $MI_2$ ranging from 0.10 to 6.0 g/10 min, preferably from 0.15 to 4.5 g/10 min, preferably 0.20 to 4.0 g/10 min, preferably from 0.20 to 3.5 g/10 min, preferably from 0.20 to 3.0 g/10 min, preferably from 0.20 to 2.5 g/10 min, as determined according to ISO 1133:1997 at a temperature of 190° C. and under a load of 2.16 kg; and
a melt strength of X in Newtons, as determined by Göttfert Rheotens Melt Strength Apparatus, 190° C., as described in the Experimental section, satisfying the following equation (1)

$$X \text{ is greater than } -0.026 \ln(MI_2)+0.0498 \tag{1};$$

and
a molecular weight distribution $M_w/M_n$ of at least 3.0, preferably at least 3.3, preferably at least 3.5, preferably at least 3.6, preferably at least 3.7.
15. The polyethylene resin according to any one of statements 1-14, wherein said polyethylene resin has a melt index HLMI ranging from 2.4 to 150 g/10 min, preferably from 3.0 to 110 g/10 min, preferably 4.0 to 95.0 g/10 min, preferably from 5.0 to 80.0 g/10 min, preferably from 5.0 to 70 g/10 min, preferably from 5.0 to 60 g/10 min, as determined according to ISO 1133:1997 at a temperature of 190° C. and under a load of 21.6 kg; and
a melt strength of X in Newtons, as determined by Göttfert Rheotens Melt Strength Apparatus, 190° C., as described in the Experimental section, satisfying the following equation (2)

$$X \text{ is greater than } -0.026 \ln(HLMI)+0.1334; \tag{2}$$

a molecular weight distribution $M_w/M_n$ of at least 3.0, preferably at least 3.3, preferably at least 3.5.

16. The polyethylene resin according to any one of statements 1-15, wherein the polyethylene resin has a rheology long chain branching index $g_{rheo}$ of at least 0.50, preferably at least 0.55, preferably at least 0.60, preferably at least 0.65, preferably at least 0.70.

17. The polyethylene resin according to any one of statements 1-16, wherein the polyethylene resin has a rheology long chain branching index $g_{rheo}$ of at most 1.00, preferably at most 0.98, preferably at most 0.95, preferably at most 0.93, most preferably at most 0.92.

18. The polyethylene resin according to any one of statements 1-17, wherein the polyethylene resin has a rheology long chain branching index $g_{rheo}$ of at least 0.50 to at most 0.95, preferably at least 0.60 to at most 0.95, preferably at least 0.65 to at most 0.95, preferably at least 0.70 to at most 0.95, preferably at least 0.70 to at most 0.93, preferably at least 0.71 to at most 0.92.

19. The polyethylene resin according to any one of statements 1-18, wherein said polyethylene resin has a density of at least 0.900 g/cm³ as measured according to the method of standard ISO 1183-1:2012 method A at a temperature of 23° C., preferably at least 0.905 g/cm³, preferably at least 0.910 g/cm³, preferably at least 0.912 g/cm³, preferably at least 0.915 g/cm³.

20. The polyethylene resin according to any one of statements 1-19, wherein said polyethylene resin has a density of at most 0.964 g/cm³, preferably at most 0.960 g/cm³, preferably at most 0.955 g/cm³, preferably at most 0.950 g/cm³, preferably at most 0.945 g/cm³, preferably at most 0.940 g/cm³, preferably at most 0.935 g/cm³, preferably at most 0.932 g/cm³, preferably at most 0.930 g/cm³, preferably at most 0.928 g/cm³, preferably at most 0.925 g/cm³, as measured according to the method of standard ISO 1183-1:2012 method A at a temperature of 23° C.

21. The polyethylene resin according to any one of statements 1-20, wherein said polyethylene resin has a density of at least 0.900 g/cm³ to at most 0.964 g/cm³, preferably at least 0.905 g/cm³ to at most 0.960 g/cm³, preferably at least 0.905 g/cm³ to at most 0.955 g/cm³, preferably at least 0.910 g/cm³ to at most 0.950 g/cm³, preferably at least 0.910 g/cm³ to at most 0.945 g/cm³, preferably at least 0.912 g/cm³ to at most 0.940 g/cm³, preferably at least 0.912 g/cm³ to at most 0.935 g/cm³, preferably at most 0.932 g/cm³, preferably at most 0.930 g/cm³, preferably at most 0.928 g/cm³, preferably at most 0.925 g/cm³ as measured according to the method of standard ISO 1183-1:2012 method A at a temperature of 23° C.

22. The polyethylene resin according to any one of statements 1-21, wherein said polyethylene resin is an alumoxane activated supported metallocene-catalyzed polyethylene resin.

23. The polyethylene resin according to any one of statements 1-22, wherein the metallocene catalyst composition comprises two metallocene catalysts, and an optional activator.

24. The polyethylene resin according to any one of statements 1-23, wherein the metallocene catalyst composition comprises a dual catalyst with two metallocene active sites on a single support, and an optional activator.

25. The polyethylene resin according to any one of statements 1-24, wherein said metallocene composition comprises a catalyst component A and a catalyst component B, wherein catalyst component A comprises a bridged metallocene compound with two groups independently selected from indenyl or tetrahydroindenyl, each group being unsubstituted or substituted; and catalyst component B comprises a bridged metallocene compound with a substituted or unsubstituted cyclopentadienyl group and a substituted or unsubstituted fluorenyl group; and an optional activator; an optional support; and an optional co-catalyst.

26. The polyethylene resin according to any one of statements 1-25, wherein said metallocene catalyst composition comprises a catalyst component A and a catalyst component B, wherein catalyst component A comprises a bridged metallocene compound with two tetrahydroindenyl groups, each group being unsubstituted or substituted; and catalyst component B comprises a bridged metallocene compound with a substituted or unsubstituted cyclopentadienyl group and a substituted or unsubstituted fluorenyl group; and an optional activator; an optional support; and an optional co-catalyst.

27. The polyethylene resin according to any one of statements 1-25, wherein said metallocene catalyst composition comprises a catalyst component A and a catalyst component B, wherein catalyst component A comprises a bridged metallocene compound with two indenyl groups each indenyl being independently substituted with one or more substituents, wherein at least one of the substituent is an aryl or heteroaryl; preferably wherein the aryl or heteroaryl substituent is on the 3-position on each indenyl; and catalyst component B comprises a bridged metallocene compound with a substituted or unsubstituted cyclopentadienyl group and a substituted or unsubstituted fluorenyl group; and an optional activator; an optional support; and an optional co-catalyst 28. The polyethylene resin according to any one of statements 24-27, wherein the bridged metallocene compound of catalyst component B comprises at least one alkenyl, cycloalkenyl, or cycloalkenylalkyl substituent, preferably at least one $C_{3-20}$alkenyl, $C_{5-20}$cycloalkenyl, or $C_{6-20}$cycloalkenylalkyl substituent, more preferably at least one $C_{3-8}$alkenyl, $C_{5-8}$cycloalkenyl, or $C_{6-8}$cycloalkenylalkyl substituent.

29. The polyethylene resin according to any one of statements 24-28, wherein catalyst component B contains a C, Si, B or Ge bridging atom.

30. The polyethylene resin according to any one of statements 23-29, wherein the activator comprises an alumoxane compound, an organoboron or organoborate compound, an ionizing ionic compound, or any combination thereof, preferably wherein the activator comprises an alumoxane compound.

31. The polyethylene resin according to any one of statements 23-30, wherein the activator comprises at least one alumoxane compound of formula (V) or (VI)

$R^a$—(Al(Ra)—O)$_x$—AlR$^a_2$ (V) for oligomeric, linear alumoxanes; or (—Al(R$^a$)—O)$_y$ (VI) for oligomeric, cyclic alumoxanes wherein x is 1-40, and preferably 10-20;
wherein y is 3-40, and preferably 3-20; and
wherein each R$^a$ is independently selected from a $C_{1-8}$alkyl, and preferably is methyl.

32. The polyethylene resin according to any one of statements 23-31, wherein the activator is methyl alumoxane.

33. The polyethylene resin according to any one of statements 1-32, wherein the metallocene catalyst composition comprises a co-catalyst.
34. The polyethylene resin according to any one of statements 1-33, wherein the metallocene catalyst composition comprises an organoaluminum co-catalyst.
35. The polyethylene resin according to any one of statements 1-34, wherein the metallocene catalyst composition comprises an organoaluminum co-catalyst selected from the group comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and any combination thereof.
36. The polyethylene resin according to any one of statements 1-35, wherein the metallocene catalyst composition comprises a support comprising a solid oxide, preferably a solid inorganic oxide, preferably, the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof.
37. The polyethylene resin according to any one of statements 19-36, wherein the support has a D50 of at most 50 μm, preferably of at most 40 μm, preferably of at most 30 μm. The D50 is defined as the particle size for which fifty percent by weight of the particles has a size lower than the D50. The particle size may be measured by laser diffraction analysis on a Malvern type analyzer.
38. The polyethylene resin according to any one of statements 1-37, wherein the metallocene catalyst composition comprises an alumoxane activator; and a titanated silica or silica solid support; and an optional co-catalyst.
39. The polyethylene resin according to any one of statements 24-38, wherein the weight ratio of catalyst component A to catalyst component B is in a range of from 1:9 to about 9:1, preferably the weight ratio of catalyst component A to catalyst component B is in a range of from 1:5 to about 5:1, preferably 1:4 to 4:1.
40. The polyethylene resin according to any one of statements 24-39, wherein catalyst component A comprises a bridged metallocene catalyst of formula (I), wherein

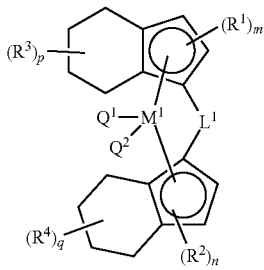

(I)

each of $R^1$, $R^2$, $R^3$ and $R^4$, are independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, and heteroalkyl; wherein each $R^{10}$ is independently hydrogen, alkyl, or alkenyl; and m, n, p, q are each independently an integer selected from 0, 1, 2, 3, or 4;

$L^1$ is —$[CR^8R^9]n$—, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl or heterocyclyl;

$M^1$ is a transition metal selected from the group consisting of zirconium, titanium, hafnium, and vanadium; and preferably is zirconium; and $Q^1$ and $Q^2$ are each independently selected from the group consisting of halogen, alkyl, —$N(R^{11})_2$, alkoxy, cycloalkoxy, aralkoxy, cycloalkyl, aryl, alkylaryl, aralkyl, and heteroalkyl; wherein $R^{11}$ is hydrogen or alkyl.

41. The polyethylene resin according to any one of statements 24-40, wherein the catalyst component A contains a —$[CR^8R^9]_h$— bridging group; wherein h is an integer selected from 1, 2, or 3; preferably 1 or 2, preferably 2, each of $R^8$, and $R^9$ are independently selected from the group comprising hydrogen, alkyl, alkenyl, cycloalkyl, cycloalkenyl, cycloalkenylalkyl, aryl, aminoalkyl, and arylalkyl, preferably hydrogen; or $R^8$ and $R^9$ together with the atom to which they are attached form a cycloalkyl, cycloalkenyl or heterocyclyl.

42. The polyethylene resin according to any one of statements 24-41, wherein catalyst component B comprises a bridged metallocene catalyst of formula (II), wherein

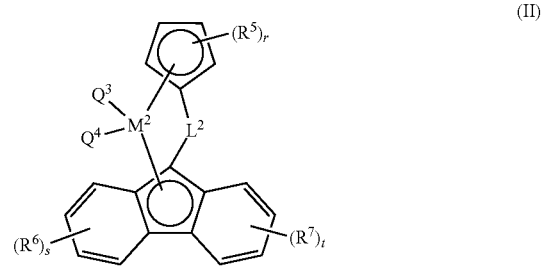

(II)

each of $R^5$, $R^6$, and $R^7$, are independently selected from the group consisting of alkyl, alkenyl, cycloalkyl, cycloalkenyl, cycloalkenylalkyl, aryl, alkoxy, alkylaryl, arylalkyl, halogen, $Si(R^{10})_3$, and heteroalkyl; wherein each $R^{10}$ is independently hydrogen, alkyl, or alkenyl; and r, s, t are each independently an integer selected from 0, 1, 2, 3, or 4;

$L^2$ is —$[CR^8R^9]_h$—, $SiR^8R^9$, $GeR^8R^9$, or $BR^8$; wherein h is an integer selected from 1, 2, or 3; each of $R^8$, and $R^9$ are independently selected from the group consisting of hydrogen, alkyl, alkenyl, cycloalkyl, cycloalkenyl, cycloalkenylalkyl, aryl, aminoalkyl, and arylalkyl; or $R^8$ and $R^9$ together with the atom to which they are attached form a cycloalkyl, cycloalkenyl, or heterocyclyl;

$M^2$ is a transition metal selected from the group consisting of zirconium, titanium, hafnium, and vanadium; and preferably is zirconium; and $Q^3$ and $Q^4$ are each independently selected from the group consisting of halogen, alkyl, $-N(R^{11})_2$, alkoxy, cycloalkoxy, aralkoxy, cycloalkyl, aryl, alkylaryl, aralkyl, and heteroalkyl; wherein $R^{11}$ is hydrogen or alkyl.

43. The polyethylene resin according to any one of statements 24-42, wherein catalyst component A comprises a bridged metallocene catalyst of formula (I), wherein

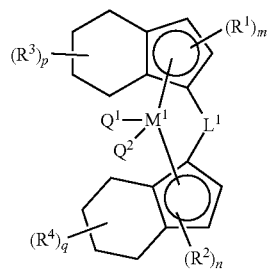

(I)

each of $R^1$, $R^2$, $R^3$ and $R^4$, are independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-12}$alkyl; wherein each $R^{10}$ is independently hydrogen, $C_{1-20}$alkyl, or $C_{3-20}$alkenyl; and m, n, p, q are each independently an integer selected from 0, 1, 2, 3, or 4;

$L^1$ is $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-12}$aryl, aminoC$_{1-6}$alkyl, and $C_7$-$C_{20}$arylalkyl; or $R^8$ and $R^9$ together with the atom to which they are attached form a $C_{3-20}$cycloalkyl, $C_{5-20}$cycloalkenyl or heterocyclyl; preferably $L^1$ is $-[CR^8R^9]_h-$;

$M^1$ is a transition metal selected from the group consisting of zirconium, titanium, hafnium, and vanadium; and preferably is zirconium; and $Q^1$ and $Q^2$ are each independently selected from the group consisting of halogen, $C_{1-20}$alkyl, $-N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl.

44. The polyethylene resin according to any one of statements 24-43, wherein catalyst component B comprises a bridged metallocene catalyst of formula (II), wherein

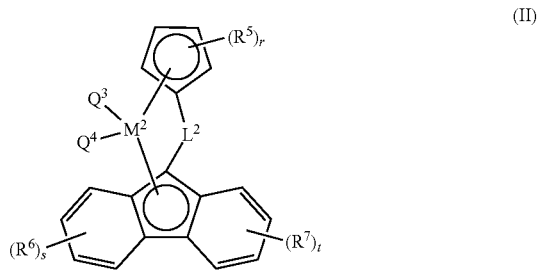

(II)

each of $R^5$, $R^6$, and $R^7$, are independently selected from the group consisting of $C_{1-20}$alkyl, $C_{3-20}$alkenyl, $C_{3-20}$cycloalkyl, $C_{6-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, $Si(R^{10})_3$, and heteroC$_{1-20}$alkyl; wherein each $R^{10}$ is independently hydrogen, $C_{1-20}$alkyl, or $C_{3-20}$alkenyl; and r, s, t are each independently an integer selected from 0, 1, 2, 3, or 4;

$L^2$ is $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-20}$alkyl, $C_{3-20}$alkenyl, $C_{3-20}$cycloalkyl, $C_{6-20}$cycloalkenyl, $C_{6-20}$cycloalkenylalkyl, $C_{6-12}$aryl, aminoC$_{1-6}$alkyl, and $C_7$-$C_{20}$arylalkyl; or $R^8$ and $R^9$ together with the atom to which they are attached form a $C_{3-20}$cycloalkyl, $C_{6-20}$cycloalkenyl or heterocyclyl;

$M^2$ is a transition metal selected from the group consisting of zirconium, titanium, hafnium, and vanadium; and preferably is zirconium; and $Q^3$ and $Q^4$ are each independently selected from the group consisting of halogen, $C_{1-20}$alkyl, $-N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and heteroC$_{1-20}$alkyl; wherein $R^{11}$ is hydrogen or $C_{1-20}$alkyl.

45. The polyethylene resin according to any one of statements 40-44, wherein each of $R^1$, $R^2$, $R^3$ and $R^4$, are independently selected from the group consisting of $C_{1-8}$alkyl, $C_{3-8}$alkenyl, $C_{3-8}$cycloalkyl, $C_{6-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, $Si(R^{10})_3$, and heteroC$_{1-8}$alkyl; wherein each $R^{10}$ is independently hydrogen, $C_{1-8}$alkyl, or $C_{3-8}$alkenyl; and m, n, p, q are each independently an integer selected from 0, 1, 2, 3, or 4;

$L^1$ is $-[CR^8R^9]_h-$, $SiR^8R^9$, $GeR^8R^9$, or $BR^8$; wherein h is an integer selected from 1, 2, or 3; each of $R^8$, and $R^9$ are independently selected from the group consisting of hydrogen, $C_{1-8}$alkyl, $C_{3-8}$alkenyl, $C_{3-8}$cycloalkyl, $C_{6-8}$cycloalkenyl, $C_{6-8}$cycloalkenylalkyl, $C_{6-12}$aryl, aminoC$_{1-6}$alkyl, and $C_7$-$C_{12}$arylalkyl; or $R^8$ and $R^9$ together with the atom to which they are attached form a $C_{3-8}$cycloalkyl, $C_{5-8}$cycloalkenyl or heterocyclyl; preferably $L^1$ is $-[CR^8R^9]_h-$ and n is 1 or 2;

$M^1$ is a transition metal selected from the group consisting of zirconium, titanium, hafnium, and vanadium; and preferably is zirconium; and $Q^1$ and $Q^2$ are each independently selected from the group consisting of halogen, $C_{1-8}$alkyl, $-N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and heteroC$_{1-8}$alkyl; wherein $R^{11}$ is hydrogen or $C_{1-8}$alkyl.

46. The polyethylene resin according to any one of statements 40-45, wherein each of $R^5$, $R^8$, and $R^7$, are independently selected from the group consisting of $C_{1-8}$alkyl, $C_{3-8}$alkenyl, $C_{3-8}$cycloalkyl, $C_{3-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, Si(R$^{10}$)$_3$, and heteroC$_{1-8}$alkyl; wherein each $R^{10}$ is independently hydrogen, $C_{1-8}$alkyl, or $C_{3-8}$alkenyl; and r, s, t are each independently an integer selected from 0, 1, 2, 3, or 4; $L^2$ is —[CR$^8$R$^9$]$_h$—, SiR$^8$R$^9$, GeR$^8$R$^9$, or BR$^8$; wherein h is an integer selected from 1, 2, or 3; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, aminoC$_{1-6}$alkyl, and $C_7$-$C_{12}$arylalkyl; or $R^8$ and $R^9$ together with the atom to which they are attached form a $C_{3-8}$cycloalkyl, $C_{5-8}$cycloalkenyl or heterocyclyl;
$M^2$ is a transition metal selected from the group consisting of zirconium, titanium, hafnium, and vanadium; and preferably is zirconium; and
$Q^3$ and $Q^4$ are each independently selected from the group consisting of halogen, $C_{1-8}$alkyl, —N(R$^{11}$)$_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and heteroC$_{1-8}$alkyl; wherein $R^{11}$ is hydrogen or $C_{1-8}$alkyl.

47. The polyethylene resin according to any one of statements 40-46, wherein each of $R^1$, $R^2$, $R^3$ and $R^4$, are independently selected from the group consisting of $C_{1-8}$alkyl, $C_{3-8}$alkenyl, $C_{3-8}$cycloalkyl, $C_{7-12}$aryl, and halogen; and m, n, p, q are each independently an integer selected from 0, 1, 2, 3, or 4; preferably 0, 1, 2, or 3, preferably 0, 1, or 2; preferably 0, or 1;
$L^1$ is —[CR$^8$R$^9$]$_h$—, or SiR$^8$R$^9$; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl; $C_{5-8}$cycloalkenyl, $C_{6-8}$cycloalkenylalkyl, and $C_{6-12}$aryl; preferably $L^1$ is —[CR$^8$R$^9$]$_h$— and n is 1 or 2, and each of $R^8$, and $R^9$ are independently selected from the group consisting of hydrogen, and $C_{1-8}$alkyl; preferably $L^1$ is —[CR$^8$R$^9$]$_h$— and n is 2, and each of $R^8$, and $R^9$ are independently hydrogen;
$M^1$ is a transition metal selected from zirconium, or hafnium; and preferably zirconium; and
$Q^1$ and $Q^2$ are each independently selected from the group consisting of halogen, $C_{1-8}$alkyl, —N(R$^{11}$)$_2$, $C_{6-12}$aryl, and $C_{7-12}$aralkyl; wherein $R^{11}$ is hydrogen or $C_{1-8}$alkyl, preferably $Q^1$ and $Q^2$ are each independently selected from the group consisting of Cl, F, Br, I, methyl, benzyl, and phenyl.

48. The polyethylene resin according to any one of statements 40-47, wherein each of $R^5$, $R^6$, and $R^7$, is independently selected from the group consisting of $C_{1-8}$alkyl, $C_{3-8}$alkenyl, $C_{3-8}$cycloalkyl, $C_{6-12}$aryl, and halogen; and r, s, t are each independently an integer selected from 0, 1, 2, 3, or 4; preferably 0, 1, 2, or 3, preferably 0, 1, or 2; preferably 0, or 1;
$L^2$ is —[CR$^8$R$^9$]$_h$—, or SiR$^8$R$^9$; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl; $C_{5-8}$cycloalkenyl, $C_{6-8}$cycloalkenylalkyl, and $C_{6-12}$aryl;
$M^2$ is a transition metal selected from zirconium, or hafnium; and preferably zirconium; and
$Q^3$ and $Q^4$ are each independently selected from the group consisting of halogen, $C_{1-8}$alkyl, —N(R$^{11}$)$_2$, $C_{6-12}$aryl, and $C_{7-12}$aralkyl; wherein $R^{11}$ is hydrogen or $C_{1-8}$alkyl, preferably $Q^1$ and $Q^2$ are each independently selected from the group consisting of Cl, F, Br, I, methyl, benzyl, and phenyl.

49. The polyethylene resin according to any one of statements 1-48, wherein said polyethylene resin is a homopolymer.

50. The polyethylene resin according to any one of statements 1-48, wherein said polyethylene resin is a copolymer of ethylene and a higher alpha-olefin co-monomer.

51. The polyethylene resin according to any one of statements 1-48, and 50, wherein said polyethylene resin is a copolymer of ethylene and a higher alpha-olefin co-monomer selected from the group comprising propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

52. The polyethylene resin according to any one of statements 1-48, 50-51, wherein said polyethylene resin is a copolymer of ethylene and 1-butene, or 1-hexene, preferably 1-hexene.

53. The polyethylene resin according to any one of statements 1-48, 50-52, wherein said polyethylene resin is a copolymer of ethylene and a higher alpha-olefin co-monomer, preferably 1-hexene, wherein the total co-monomer content, especially 1-hexene (wt % C6) relative to the total weight of the polyethylene is at least 0.5% by weight, preferably at least 1.0% by weight, preferably at least 1.5% by weight, preferably at least 2.0% by weight, preferably at least 2.5% by weight, preferably at least 3.0% by weight, as determined by $^{13}$C NMR analysis.

54. The polyethylene resin according to any one of statements 1-48, 50-53, wherein said polyethylene resin is a copolymer of ethylene and a higher alpha-olefin co-monomer, preferably 1-hexene, wherein said polyethylene resin has a reverse co-monomer distribution as determined by GPC-IR.

55. The polyethylene resin according to any one of statements 1-54, wherein said continuous process is performed in at least one continuously stirred tank reactor or at least one a loop reactor, preferably in at least one slurry loop reactor.

56. A continuous process for the preparation of a polyethylene resin according to any one of statements 1-55, the process comprising: contacting at least one metallocene catalyst composition, with ethylene, optionally hydrogen, and optionally one or more alpha-olefin co-monomers; and polymerizing the ethylene, and the optionally one or more alpha-olefin co-monomers, in the presence of said at least one metallocene catalyst composition, and optional hydrogen, thereby obtaining the polyethylene resin.

57. The process according to statement 56, wherein the process is conducted in one or more slurry loop reactors, continuously stirred tank reactors, gas-phase reactors, or a combination thereof.

58. The process according to any one of statements 56-57, wherein the co-monomer is selected from the group comprising propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and a mixture thereof, preferably 1-butene, and 1-hexene, preferably 1-hexene.

59. The process according to any one of statements 56-58, wherein said metallocene catalyst composition is as described in any one of statements 22-48.

60. An article comprising the polyethylene resin according to any one of statements 1-55.

61. The article according to statement 60, wherein the article is selected from a film, a cap and closure, a yarn, a rotomoulded article, blow moulded article, a pipe and a fiber.

62. The article according to any one of statements 60-61, wherein the article is a film.

63. Use of a polyethylene resin according to any one of statements 1-55, in film applications, injections applications, blow moulding applications, rotomoulding applications, extrusion applications, yarn applications, and in polyethylene of raised temperature resistance (PE-RT).

The present invention provides a polyethylene resin prepared using a continuous process, in the presence of at least one metallocene catalyst composition, said polyethylene resin having: a molecular weight distribution $M_w/M_n$ lower than 6.5; preferably a $M_w/M_n$ of at least 3.5 a melt index ranging from an HLMI at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg, and preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30; and a melt strength of X Newtons, as determined by Göttfert Rheotens Melt Strength Apparatus, 190° C., as described in the Experimental section, satisfying the following equations (1) and/or (2)

$$X \text{ is greater than } -0.026 \ln(M/2)+0.0498 \quad (1)$$

$$X \text{ is greater than } -0.026 \ln(HLMI)+0.1334 \quad (2)$$

with $M_w$ being the weight-average molecular weight and $M_n$ being the number-average molecular weight.

In an embodiment, the invention relates to a polyethylene resin prepared using a continuous process and at least one metallocene catalyst composition, said polyethylene resin having: a molecular weight distribution $M_w/M_n$ lower than 6.5; preferably a molecular weight distribution $M_w/M_n$ of at least 3.5;

a melt index HLMI ranging from at least 1.20 g/10 min to at most 150 g/10 min wherein HLMI is determined according to ISO 1133:1997, at a temperature of 190° C. and under a load of 21.6 kg; preferably a HLMI ranging from 2.4 to 150 g/10 min, preferably from 3.6 to 120 g/10 min, preferably 4.8 to 110 g/10 min, preferably from 5.0 to 95.0 g/10 min, preferably from 5.0 to 85.0 g/10 min, preferably from 5.0 to 70.0 g/10 min, preferably from 5.0 to 60.0 g/10 min, preferably from 5.0 to 50.0 g/10 min, preferably from 5.0 to 45.0 g/10 min; preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30; and a melt strength of X in Newtons, satisfying the following equation (2):

$$X \text{ is greater than } -0.026 \ln(HLMI)+0.1334 \quad (2)$$

In a preferred embodiment, the invention relates to a polyethylene resin prepared using a continuous process and at least one metallocene catalyst composition, said polyethylene resin having:

a molecular weight distribution $M_w/M_n$ lower than 6.5; preferably a molecular weight distribution $M_w/M_n$ of at least 3.5;

a melt index $MI_2$ ranging from at least 0.1 g/10 min to at most 6.0 g/10 min wherein $MI_2$ is determined according to ISO 1133:1997 at a temperature of 190° C. and under a load of 2.16 kg; a melt index $MI_2$ ranging from 0.15 to 5.0 g/10 min, preferably 0.20 to 4.5 g/10 min, preferably from 0.20 to 4.0 g/10 min, preferably from 0.20 to 3.5 g/10 min, preferably from 0.20 to 3.0 g/10 min, preferably from 0.20 to 2.5 g/10 min, preferably from 0.20 to 2.0 g/10 min, preferably from 0.20 to 1.8 g/10 min; preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30; and a melt strength of X Newtons, satisfying the following equation (1):

$$X \text{ is greater than } -0.026 \ln(MI_2)+0.0498 \quad (1)$$

The term "polyethylene resin" or "polyethylene" as used herein refers to the polyethylene fluff or powder that is extruded, and/or melted, and/or pelleted and can be prepared through compounding and homogenizing of the polyethylene resin as taught herein, for instance, with mixing and/or extruder equipment. Unless otherwise stated, all parameters used to define the polyethylene resin, are as measured on polyethylene pellets.

The term "fluff" or "powder" as used herein refers to the polyethylene material with the solid catalyst particle at the core of each grain and is defined as the polymer material after it exits the polymerization reactor (or final polymerization reactor in the case of multiple reactors connected in series). The term "pellets" refers to the polyethylene resin that has been pelletized, for example through melt extrusion. As used herein, the terms "extrusion" or "extrusion process", "pelletization" or "pelletizing" are used herein as synonyms and refer to the process of transforming polyolefin resin into a "polyolefin product" or into "pellets" after pelletizing. The process of pelletization preferably comprises several devices connected in series, including one or more rotating screws in an extruder, a die, and means for cutting the extruded filaments into pellets.

In an embodiment, the polyethylene resin is a homopolymer. The term "ethylene homopolymer" as used herein is intended to encompass polymers which consist essentially of repeat units deriving from ethylene. Homopolymers may, for example, comprise at least 99.8% preferably 99.9% by weight of repeats units derived from ethylene, as determined for example by $^{13}$C NMR spectrometry.

In another embodiment, the polyethylene resin is an ethylene copolymer. The term "ethylene copolymer" as used herein is intended to encompass polymers which consist essentially of repeat units deriving from ethylene and at least one other $C_3$-$C_{20}$ alpha-olefin co-monomer, preferably wherein the co-monomer is 1-hexene.

As used herein, the term "co-monomer" refers to olefin co-monomers which are suitable for being polymerized with alpha-olefin monomer. Co-monomers may comprise but are not limited to aliphatic $C_3$-$C_{20}$ alpha-olefins, preferably $C_3$-$C_{12}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In some preferred embodiments, said co-monomer is 1-hexene.

In some embodiments, said polyethylene resin is a copolymer of ethylene and a higher alpha-olefin co-monomer, preferably 1-hexene, wherein the total co-monomer content, preferably 1-hexene (wt % C6) relative to the total weight of the polyethylene is at least 0.5% by weight, preferably at least 1.0% by weight, preferably at least 1.5% by weight, preferably at least 2.0% by weight, preferably at least 2.5% by weight, preferably at least 3.0% by weight, as determined by $^{13}$C NMR analysis. In some embodiments, said polyethylene resin is a copolymer of ethylene and a higher alpha-olefin co-monomer, preferably 1-hexene, wherein the total co-monomer content, preferably 1-hexene (wt % C6) relative to the total weight of the polyethylene is at most 18.0% by weight, preferably at most 15.0% by weight, preferably at most 10.0% by weight, as determined by $^{13}$C NMR analysis.

Ethylene copolymers described herein can, in some aspects, have a non-conventional (reverse or inverse) co-monomer distribution, i.e., the higher molecular weight portions of the polymer have higher co-monomer incorporation than the lower molecular weight portions. Preferably, there is an increasing co-monomer incorporation with increasing molecular weight, as shown by the ratio of the areas of IR signals ($A_{CH3}/A_{CH2}$) from IR5-MCT detector as function of log M.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene can have an "apparent monomodal" molecular weight distribution, which is a molecular weight distribution curve with a single peak and no shoulder. Nevertheless, the polyethylene will still be multimodal if it comprises two distinct populations of polyethylene macromolecules each having a different weight average molecular weights, as defined above, for example when the two distinct populations were prepared in different reactors and/or under different conditions and/or with different catalysts. In some embodiments, the polyethylene resin has a rheology long chain branching index $g_{rheo}$ of at least 0.55, preferably at least 0.65, preferably at least 0.71. In some embodiments, the polyethylene resin has a rheology long chain branching index $g_{rheo}$ of at most 1.00, preferably at most 0.99, preferably at most 0.96, preferably at most 0.94. In some embodiments, the polyethylene resin has a rheology long chain branching index $g_{rheo}$ of at least 0.55 to at most 0.95, preferably at least 0.65 to at most 0.95, preferably at least 0.65 to at most 0.94, preferably at least 0.70 to at most 0.94, preferably at least 0.70 to at most 0.93, preferably at least 0.71 to at most 0.92.

In some preferred embodiment, the polyethylene resin of the invention has: a molecular weight distribution $M_w/M_n$ lower than 6.5; preferably a molecular weight distribution $M_w/M_n$ of at least 3.5;

a melt index ranging from an HLMI at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equations (1) and/or (2)

$$X \text{ is greater than } -0.026 \ln(MI_2)+0.0498 \tag{1}$$

$$X \text{ is greater than } -0.026 \ln(HLMI)+0.1334; \tag{2}$$

and a rheology long chain branching index grheo of at least 0.65 and at most 0.99, preferably at least 0.71 and at most 0.96, preferably at most 0.95.

In some embodiments, the polyethylene resin has a density of at least 0.900 g/cm$^3$, preferably at least 0.903 g/cm$^3$ as measured according to the method of standard ISO 1183-1:2012 method A at a temperature of 23° C., preferably at least 0.908 g/cm$^3$, preferably at least 0.910 g/cm$^3$, preferably at least 0.914 g/cm$^3$, preferably at least 0.915 g/cm$^3$. In some embodiments, the polyethylene resin has a density of at most 0.964 g/cm$^3$, preferably at most 0.960 g/cm$^3$, preferably at most 0.956 g/cm$^3$, preferably at most 0.951 g/cm$^3$, preferably at most 0.948 g/cm$^3$, preferably at most 0.945 g/cm$^3$, preferably at most 0.935 g/cm$^3$, preferably at most 0.934 g/cm$^3$, preferably at most 0.932 g/cm$^3$, preferably at most 0.930 g/cm$^3$, preferably at most 0.928 g/cm$^3$, preferably at most 0.925 g/cm$^3$. Preferably, the polyethylene resin has a density of at least 0.903 g/cm$^3$ to at most 0.955 g/cm$^3$, preferably of at least 0.905 g/cm$^3$ to at most 0.950 g/cm$^3$, preferably at least 0.910 g/cm$^3$ to at most 0.945 g/cm$^3$, preferably at least 0.913 g/cm$^3$ to at most 0.940 g/cm$^3$, preferably at least 0.913 g/cm$^3$ to at most 0.935 g/cm$^3$, preferably at least 0.913 g/cm$^3$ to at most 0.934 g/cm$^3$.

In some preferred embodiment, the polyethylene resin of the invention has:

a molecular weight distribution $M_w/M_n$ lower than 6.5; preferably a molecular weight distribution $M_w/M_n$ of at least 3.5;

a melt index ranging from an HLMI of at least 1.20 g/10 min to an $MI_2$ of at most 6.0 g/10 min; preferably a HLMI ranging from 1.20 g/10 min to 150 g/10 min; preferably a melt index ranging $MI_2$ from 0.1 g/10 min to 6.0 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equations (1) and/or (2)

$$X \text{ is greater than } -0.026 \ln(M/2)+0.0498 \quad (1)$$

$$X \text{ is greater than } -0.026 \ln(HLMI)+0.1334; \quad (2)$$

and a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

In some preferred embodiment, the polyethylene resin of the invention has: a molecular weight distribution $M_w/M_n$ lower than 6.5; preferably a molecular weight distribution $M_w/M_n$ of at least 3.5;

a melt index ranging from an HLMI of at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334; \quad (2)$$

a rheology long chain branching index grheo of at least 0.65 and at most 0.99, preferably at least 0.71 and at most 0.96, preferably at most 0.95; and a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

Preferably, the polyethylene resin has a molecular weight distribution $M_z/M_w$ lower than 3.5, preferably lower than 3.3, preferably lower than 3.0, with $M_z$ being the z average molecular weight.

In some preferred embodiment, the polyethylene resin of the invention has: a molecular weight distribution $M_w/M_n$ lower than 6.5; preferably a molecular weight distribution $M_w/M_n$ of at least 3.5;

a molecular weight distribution $M_z/M_w$ lower than 3.5, preferably lower than 3.3, preferably lower than 3.0;

a melt index ranging from an HLMI of at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334; \quad (2)$$

and a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

In some preferred embodiment, the polyethylene resin of the invention has: a molecular weight distribution $M_w/M_n$ lower than 6.5; preferably a molecular weight distribution $M_w/M_n$ of at least 3.5;

a molecular weight distribution $M_z/M_w$ lower than 3.5, preferably lower than 3.3, preferably lower than 3.0;

a melt index ranging from an HLMI at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334; \quad (2)$$

a rheology long chain branching index grheo of at least 0.65 and at most 0.99, preferably at least 0.71 and at most 0.96, preferably at most 0.95; and a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

Preferably, the polyethylene resin has a molecular weight distribution $M_w/M_n$ of at least 3.0, preferably at least 3.1, preferably at least 3.3, preferably at least 3.5, preferably at least 3.6, preferably at least 3.7. Preferably, the polyethylene resin has a molecular weight distribution (MWD) $M_w/M_n$ of at most 6.5, preferably at most 6.4, preferably at most 6.1, preferably at most 5.5, preferably at most 5.3, preferably at most 5.0. The present polyethylene resins have the advantage of having high melt strength, with a narrow MWD (i.e. below 6.5), together with a grheo of at least 0.55 and more.

In some preferred embodiment, the polyethylene resin of the invention has: a molecular weight distribution $M_w/M_n$ lower than 6.5 and of at least 3.5, preferably lower than 6.5 and of at least 3.6, preferably lower than 6.0 and of at least 3.5;
  a melt index ranging from an HLMI of at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;
  a melt strength of X Newtons, satisfying the following equations (1) and/or (2)

$$X \text{ is greater than } -0.026 \ln(MI_2)+0.0498; \quad (1)$$

$$X \text{ is greater than } -0.026 \ln(HLMI)+0.1334; \quad (2)$$

preferably a molecular weight distribution $M_z/M_w$ lower than 3.5, preferably lower than 3.3, preferably lower than 3.0; and
  preferably a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

In some preferred embodiment, the polyethylene resin of the invention has: a molecular weight distribution $M_w/M_n$ lower than 6.5 and of at least 3.5, preferably lower than 6.5 and of at least 3.6, preferably lower than 6.0 and of at least 3.5;
  a melt index ranging from an HLMI of at least 1.20 g/10 min to an $MI_2$ of at most 6.0 g/10 min; preferably an HLMI ranging from 1.20 g/10 min to 150 g/10 min; preferably a melt index ranging $MI_2$ from 0.1 g/10 min to 6.0 g/10 min; preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;
  a melt strength of X Newtons, satisfying the following equations (1) and/or (2)

$$X \text{ is greater than } -0.026 \ln(M/2)+0.0498 \quad (1)$$

$$X \text{ is greater than } -0.026 \ln(HLMI)+0.1334; \quad (2)$$

preferably a molecular weight distribution $M_z/M_w$ lower than 3.5, preferably lower than 3.3, preferably lower than 3.0;
  preferably a rheology long chain branching index grheo of at least 0.65 and at most 0.99, preferably at least 0.71 and at most 0.96, preferably at most 0.95; and
  preferably a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

Preferably, the polyethylene resin has a melt index $MI_2$ ranging from 0.10 to 6.0 g/10 min, preferably from 0.15 to 5.0 g/10 min, preferably 0.20 to 4.5 g/10 min, preferably from 0.20 to 4.0 g/10 min, preferably from 0.20 to 3.5 g/10 min, preferably from 0.20 to 3.0 g/10 min, preferably from 0.20 to 2.5 g/10 min, preferably from 0.20 to 2.0 g/10 min, preferably from 0.20 to 1.8 g/10 min, as determined according to ISO 1133:1997 at a temperature of 190° C. and under a load of 2.16 kg.

In some preferred embodiment, the polyethylene resin of the invention has: a molecular weight distribution $M_w/M_n$ lower than 6.5 and preferably of at least 3.5, preferably lower than 6.5 and of at least 3.6, preferably lower than 6.0 and of at least 3.5;
  a melt index $MI_2$ ranging from 0.10 g/10 min to 6.0 g/10 min; preferably from 0.15 to 5.0 g/10 min, preferably 0.20 to 4.5 g/10 min, preferably from 0.20 to 4.0 g/10 min, preferably from 0.20 to 3.5 g/10 min, preferably from 0.20 to 3.0 g/10 min, preferably from 0.20 to 2.5 g/10 min, preferably from 0.20 to 2.0 g/10 min, preferably from 0.20 to 1.8 g/10 min; preferably a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;
  a melt strength of X Newtons, satisfying the following equation (1)

$$X \text{ is greater than } -0.026 \ln(MI_2)+0.0498 \quad (1)$$

preferably a molecular weight distribution $M_z/M_w$ lower than 3.5, preferably lower than 3.3, preferably lower than 3.0;
  preferably a rheology long chain branching index grheo of at least 0.65 and at most 0.99, preferably at least 0.71 and at most 0.96, preferably at most 0.95; and
  preferably a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

Preferably, the polyethylene resin has a melt index HLMI ranging from 2.4 to 150 g/10 min, preferably from 3.6 to 120 g/10 min, preferably 4.8 to 110 g/10 min, preferably from 5.0 to 95.0 g/10 min, preferably from 5.0 to 85.0 g/10 min, preferably from 5.0 to 70.0 g/10 min, preferably from 5.0 to 60.0 g/10 min, preferably from 5.0 to 50.0 g/10 min, preferably from 5.0 to 45.0 g/10 min, as determined according to ISO 1133:1997, at a temperature of 190° C. and under a load of 21.6 kg.

Preferably, the polyethylene resin has a melt index ratio $HLMI/MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30.

In some preferred embodiment, the polyethylene resin of the invention has: a molecular weight distribution $M_w/M_n$ lower than 6.5 and preferably of at least 3.5, preferably lower than 6.5 and of at least 3.6, preferably lower than 6.0 and of at least 3.5;

a melt index HLMI ranging from 2.4 to 150 g/10 min, preferably from 3.6 to 120 g/10 min, preferably 4.8 to 110 g/10 min, preferably from 5.0 to 95.0 g/10 min, preferably from 5.0 to 85.0 g/10 min, preferably from 5.0 to 70.0 g/10 min, preferably from 5.0 to 60.0 g/10 min, preferably from 5.0 to 50.0 g/10 min, preferably from 5.0 to 45.0 g/10 min; preferably a melt index ratio HLMI/MI$_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;

a melt strength of X Newtons, satisfying the following equation (2)

$$X \text{ is greater than } -0.026 \ln(\text{HLMI})+0.1334; \qquad (2)$$

preferably a molecular weight distribution $M_z/M_w$ lower than 3.5, preferably lower than 3.3, preferably lower than 3.0;

preferably a rheology long chain branching index grheo of at least 0.65 and at most 0.99, preferably at least 0.71 and at most 0.96, preferably at most 0.95; and preferably a density of at least 0.905 g/cm$^3$ to at most 0.940 g/cm$^3$, preferably at least 0.910 g/cm$^3$ to at most 0.935 g/cm$^3$, preferably at least 0.913 g/cm$^3$ to at most 0.934 g/cm$^3$, preferably at most 0.932 g/cm$^3$, preferably at most 0.930 g/cm$^3$, preferably at most 0.928 g/cm$^3$, preferably at most 0.925 g/cm$^3$.

In some preferred embodiment, the polyethylene resin of the invention has a molecular weight distribution $M_z/M_n$ of at least 8.0 preferably a $M_z/M_n$ of at least 8.5, preferably a $M_z/M_n$ of at least 9.0, with $M_z$ being the z average molecular weight and $M_n$ being the number-average molecular weight.

According to the invention, the polyethylene resin is a metallocene-catalyzed polyethylene resin. According to this invention the terms "metallocene-catalyzed polyethylene resin", "polyethylene resin prepared using at least one metallocene catalyst composition", and the term "polyethylene resin prepared in the presence of at least one metallocene catalyst", are synonyms.

As used herein, the term "catalyst" refers to a substance that causes a change in the rate of a polymerization reaction. It is especially applicable to catalysts suitable for the polymerization of ethylene to polyethylene.

The present invention therefore concerns polyethylene prepared preferably in the presence of at least one metallocene catalyst composition. As used herein, the terms "metallocene-catalyzed polyethylene resin", and "metallocene-catalyzed polyethylene" are synonymous and used interchangeably and refers to a polyethylene prepared in the presence of a metallocene catalyst composition.

The term "metallocene catalyst" or "metallocene" for short is used herein to describe any transition metal complexes comprising metal atoms bonded to one or more ligands. The preferred metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes typically comprise a single metal site, which allows for more control of branching and molecular weight distribution of the polymer. Monomers are inserted between the metal and the growing chain of polymer.

Preferably, the metallocene catalyst composition comprises a dual catalyst which means a catalyst particle with two metallocene active sites on a single support. For example, catalyst "A" can produce short chains without co-monomer while catalyst "B" can produce longer chains with high concentration of co-monomer. The catalyst composition can be used in single reactor processes or even in multi-reactors processes.

Preferably, the metallocene catalyst composition comprises:

catalyst component A comprising a bridged metallocene compound with two groups independently selected from indenyl or tetrahydroindenyl, each group being unsubstituted or substituted; preferably catalyst component A comprises a bridged metallocene compound with two tetrahydroindenyl groups, each group being unsubstituted or substituted;

catalyst component B comprising a bridged metallocene compound with a substituted or unsubstituted cyclopentadienyl group and a substituted or unsubstituted fluorenyl group; an optional activator; an optional support; and an optional co-catalyst.

In one embodiment, the bridged metallocene catalyst can be represented by formula (III) for catalyst A, and formula (IV) for catalyst B: wherein

$$L^1(Ar^1)_2 M^1 Q^1 Q^2 \qquad (III),$$

$$L^2(Ar^2)(Ar^3) M^2 Q^3 Q^4 \qquad (IV),$$

each Ar$^1$ is independently indenyl or tetrahydroindenyl, optionally substituted with one or more substituents each independently selected from the group consisting of alkyl, alkenyl, cycloalkyl, aryl, alkoxy, alkylaryl, arylalkyl, halogen, Si(R$^{10}$)$_3$, heteroalkyl; wherein each R$^{10}$ is independently hydrogen, alkyl, or alkenyl. Each indenyl or tetrahydroindenyl component may be substituted in the same way or differently from one another at one or more positions of either of the fused rings, each substituent can be independently chosen. Preferably, each Ar$^1$ is tetrahydroindenyl, optionally substituted with one or more substituents each independently selected from the group consisting of alkyl, alkenyl, cycloalkyl, aryl, alkoxy, alkylaryl, arylalkyl, halogen, Si(R$^{10}$)$_3$, heteroalkyl; wherein each R$^{10}$ is independently hydrogen, alkyl, or alkenyl;

Ar$^2$ is cyclopentadienyl, optionally substituted with one or more substituents each independently selected from the group consisting of alkyl, alkenyl, cycloalkyl, cycloalkenyl, or cycloalkenylalkyl, aryl, alkoxy, alkylaryl, arylalkyl, halogen, Si(R$^{10}$)$_3$, heteroalkyl; wherein each R$^{10}$ is independently hydrogen, alkyl, or alkenyl;

Ar$^3$ is fluorenyl, optionally substituted with one or more substituents each independently selected from the group consisting of alkyl, alkenyl, cycloalkyl, cycloalkenyl, or cycloalkenylalkyl, aryl, alkoxy, alkylaryl, arylalkyl, halogen, Si(R$^{10}$)$_3$, heteroalkyl; wherein each R$^{10}$ is independently hydrogen, alkyl, or alkenyl;

each of M$^1$ and M$^2$ is a transition metal selected from the group consisting of zirconium, hafnium, titanium, and vanadium; and preferably is zirconium;

Q$^1$ and Q$^2$ are each independently selected from the group consisting of halogen, alkyl, —N(R$^{11}$)$_2$, alkoxy, cycloalkoxy, aralkoxy, cycloalkyl, aryl, alkylaryl, aralkyl, and heteroalkyl; wherein R$^{11}$ is hydrogen or alkyl;

Q³ and Q⁴ are each independently selected from the group consisting of halogen, alkyl, —N(R¹¹)₂, alkoxy, cycloalkoxy, aralkoxy, cycloalkyl, aryl, alkylaryl, aralkyl, and heteroalkyl; wherein R¹¹ is hydrogen or alkyl;

$L^1$ is a divalent group or moiety bridging the two $Ar^1$ groups, preferably selected from —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, alkyl, alkenyl, cycloalkyl, cycloalkenyl, cycloalkenylalkyl, aryl, aminoalkyl, and arylalkyl; or R⁸ and R⁹ together with the atom to which they are attached form a cycloalkyl, cycloalkenyl or heterocyclyl; preferably $L^1$ is —[CR⁸R⁹]$_h$—;

$L^2$ is a divalent group or moiety bridging $Ar^2$ and $Ar^3$ groups, preferably selected from —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, alkyl, alkenyl, cycloalkyl, cycloalkenyl, cycloalkenylalkyl, aryl, aminoalkyl, and arylalkyl; or R⁸ and R⁹ together with the atom to which they are attached form a cycloalkyl, cycloalkenyl or heterocyclyl.

In some embodiments, each $Ar^1$ is tetrahydroindenyl, optionally substituted with one or more substituents each independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, Si(R¹⁰)₃, and hetero$C_{1-12}$alkyl; wherein each R¹⁰ is independently hydrogen, $C_{1-20}$alkyl, or $C_{3-20}$alkenyl. Preferably each $Ar^1$ is tetrahydroindenyl, optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, Si(R¹⁰)₃, and hetero$C_{1-8}$alkyl; wherein each R¹⁰ is independently hydrogen, $C_{1-8}$alkyl, or $C_{3-8}$alkenyl. Preferably each $Ar^1$ is tetrahydroindenyl, optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $Ar^2$ is cyclopentadienyl, optionally substituted with one or more substituents each independently selected from the group consisting of $C_{1-20}$alkyl, $C_{3-20}$alkenyl, $C_{3-20}$cycloalkyl, $C_{8-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, Si(R¹⁰)₃, and hetero$C_{1-12}$alkyl; wherein each R¹⁰ is independently hydrogen, $C_{1-20}$alkyl, or $C_{3-20}$alkenyl. Preferably $Ar^2$ is cyclopentadienyl, optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$alkoxy, $C_{7-12}$alkylaryl, $C_{7-12}$arylalkyl, halogen, Si(R¹⁰)₃, and hetero$C_{1-8}$alkyl; wherein each R¹⁰ is independently hydrogen, $C_{1-8}$alkyl, or $C_{3-8}$alkenyl. Preferably $Ar^2$ is cyclopentadienyl, optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $Ar^3$ is fluorenyl, optionally substituted with one or more substituents each independently selected from the group consisting of $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-20}$aryl, $C_{1-20}$alkoxy, $C_{7-20}$alkylaryl, $C_{7-20}$arylalkyl, halogen, Si(R¹⁰)₃, and hetero$C_{1-12}$alkyl; wherein each R¹⁰ is independently hydrogen, $C_{1-20}$alkyl, or $C_{3-20}$alkenyl. Preferably $Ar^2$ is fluorenyl, optionally substituted with one or more substituents each independently selected from the group consisting of $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, $C_{1-8}$salkoxy, $C_{7-12}$alkylaryl, $C_{7-12}$arylalkyl, halogen, Si(R¹⁰)₃, and hetero$C_{1-8}$alkyl; wherein each R¹⁰ is independently hydrogen, $C_{1-8}$alkyl, or $C_{3-8}$alkenyl. Preferably, $Ar^3$ is fluorenyl, optionally substituted with one or more substituents each independently selected from the group consisting of $C_{1-8}$alkyl, $C_{3-8}$alkenyl, $C_{3-8}$cycloalkyl, $C_{6-12}$aryl, and halogen.

In some embodiments, $L^1$ is —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, $C_{1-20}$alkyl, $C_{3-20}$alkenyl, $C_{3-20}$cycloalkyl, $C_{5-20}$cycloalkenyl, $C_{6-20}$cycloalkenylalkyl, $C_{6-12}$aryl, and $C_7$-$C_{20}$arylalkyl; or R⁸ and R⁹ together with the atom to which they are attached form a $C_{3-20}$cycloalkyl, $C_{5-20}$cycloalkenyl or heterocyclyl. Preferably $L^1$ is —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, and $C_7$-$C_{12}$arylalkyl; or R⁸ and R⁹ together with the atom to which they are attached form a $C_{3-8}$cycloalkyl, $C_{5-8}$cycloalkenyl or heterocyclyl. Preferably, $L^1$ is —[CR⁸R⁹]$_h$—, or SiR⁸R⁹; wherein h is an integer selected from 1, or 2; each of R⁸, and R⁹ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, and $C_{6-12}$aryl. Preferably, $L^1$ is —[CR⁸R⁹]$_h$—; wherein h is an integer selected from 1, or 2; each of R⁸, and R⁹ are independently selected from the group consisting of hydrogen, $C_{1-8}$alkyl, preferably hydrogen.

In some embodiments, $Q^1$ and $Q^2$ are each independently selected from the group consisting of halogen, $C_{1-20}$alkyl, —N(R¹¹)₂, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and hetero$C_{1-20}$alkyl; wherein R¹¹ is hydrogen or $C_{1-20}$alkyl. Preferably $Q^1$ and $Q^2$ are each independently selected from the group consisting of halogen, $C_{1-8}$alkyl, —N(R¹¹)₂, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and hetero$C_{1-8}$alkyl; wherein R¹¹ is hydrogen or $C_{1-8}$alkyl. Preferably, $Q^1$ and $Q^2$ are each independently selected from the group consisting of halogen, $C_{1-8}$alkyl, —N(R¹¹)₂, $C_{6-12}$aryl, and $C_{7-12}$aralkyl; wherein R¹¹ is hydrogen or $C_{1-8}$alkyl, preferably $Q^1$ and $Q^2$ are each independently selected from the group consisting of Cl, F, Br, I, methyl, benzyl, and phenyl.

In some embodiments, $L^2$ is —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, $C_{1-20}$alkyl, $C_{3-20}$alkenyl, $C_{3-20}$cycloalkyl, $C_{8-20}$cycloalkenyl, $C_{6-20}$cycloalkenylalkyl, $C_{6-12}$aryl, and $C_7$-$C_{20}$arylalkyl; or R⁸ and R⁹ together with the atom to which they are attached form a $C_{3-20}$cycloalkyl, $C_{5-20}$cycloalkenyl or heterocyclyl. Preferably $L^2$ is —[CR⁸R⁹]$_h$—, SiR⁸R⁹, GeR⁸R⁹, or BR⁸; wherein h is an integer selected from 1, 2, or 3; each of R⁸, and R⁹ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, $C_{6-12}$aryl, and $C_7$-$C_{12}$arylalkyl; or R⁸ and R⁹ together with the atom to which they are attached form a $C_{3-8}$cycloalkyl, $C_{5-8}$cycloalkenyl or heterocyclyl. Preferably, $L^2$ is —[CR⁸R⁹]$_h$—, or SiR⁸R⁹; wherein h is an integer selected from 1, or 2; each of $R^8$, and $R^9$ are independently selected from the group consisting of hydrogen, $C_{1-8}$alkyl, $C_{3-8}$alkenyl, $C_{3-8}$cycloalkyl, $C_{5-8}$cycloalkenyl, $C_{6-8}$cycloalkenylalkyl, and $C_{6-12}$aryl.

In some embodiments, $Q^3$ and $Q^4$ are each independently selected from the group consisting of halogen, $C_{1-20}$alkyl, $-N(R^{11})_2$, $C_{1-20}$alkoxy, $C_{3-20}$cycloalkoxy, $C_{7-20}$aralkoxy, $C_{3-20}$cycloalkyl, $C_{6-20}$aryl, $C_{7-20}$alkylaryl, $C_{7-20}$aralkyl, and hetero$C_{1-20}$alkyl; wherein $R^{11}$ is hydrogen or $C_{1-20}$alkyl. Preferably $Q^3$ and $Q^4$ are each independently selected from the group consisting of halogen, $C_{1-8}$alkyl, $-N(R^{11})_2$, $C_{1-8}$alkoxy, $C_{3-8}$cycloalkoxy, $C_{7-12}$aralkoxy, $C_{3-8}$cycloalkyl, $C_{6-12}$aryl, $C_{7-12}$alkylaryl, $C_{7-12}$aralkyl, and hetero$C_{1-8}$alkyl; wherein $R^{11}$ is hydrogen or $C_{1-8}$alkyl. Preferably, $Q^3$ and $Q^4$ are each independently selected from the group consisting of halogen, $C_{1-8}$alkyl, $-N(R^{11})_2$, $C_{6-12}$aryl, and $C_{7-12}$aralkyl; wherein $R^{11}$ is hydrogen or $C_{1-8}$alkyl, preferably $Q^1$ and $Q^2$ are each independently selected from the group consisting of Cl, F, Br, I, methyl, benzyl, and phenyl.

In some preferred embodiments, catalyst component A comprises a bridged metallocene catalyst of formula (1I), more preferably catalyst component A comprises a bridged metallocene catalyst of formula (I); wherein

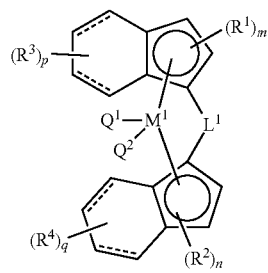

(1I)

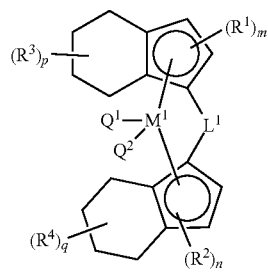

(I)

each dotted line represents an optional double bond
wherein each of $R^1$, $R^2$, $R^3$ and $R^4$, m, n, p, q, $L^1$, $M^1$, $Q^1$ and $Q^2$ have the same meaning as that defined herein above and in the statements.

A bridged metallocene catalyst component can appear in two stereo-isomeric forms: a racemic form and a meso form. In some preferred embodiments, catalyst component A is a racemic bridged bis-tetrahydroindenyl metallocene compound, preferably of formula (I).

In some preferred embodiments, catalyst component B comprises a bridged metallocene catalyst of formula (II),

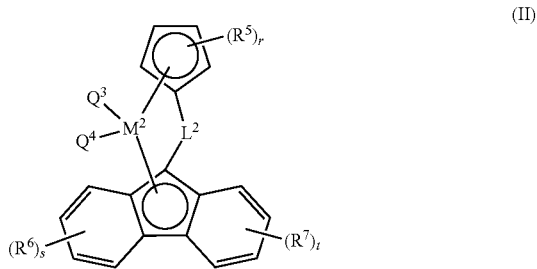

wherein each of $R^5$, $R^6$, $R^7$, r, s, t, $L^2$, $M^2$, $Q^3$ and $Q^4$ have the same meaning as that defined herein above and in the statements.

Non-limiting examples of catalyst A are shown below

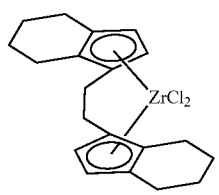

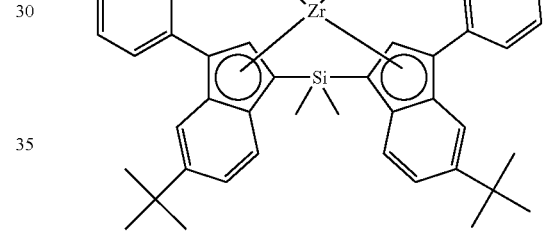

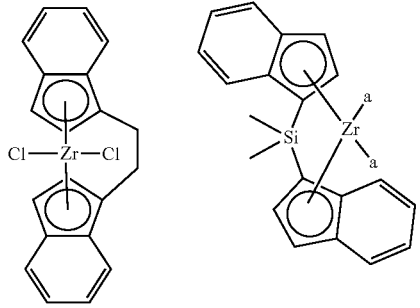

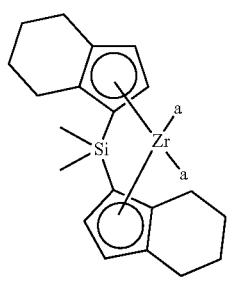

-continued
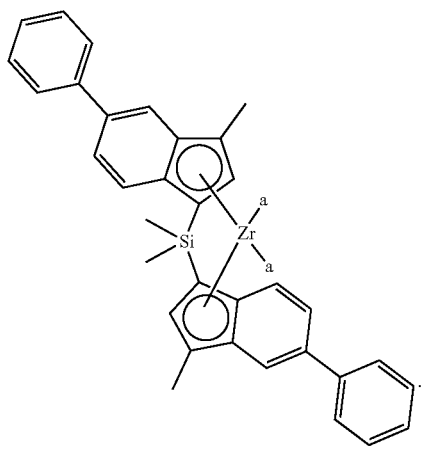
Preferred examples of catalyst A are shown below
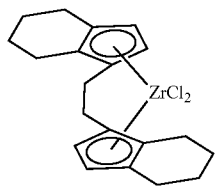
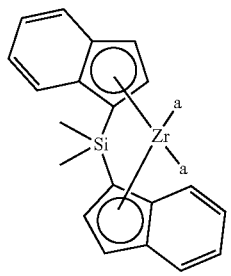
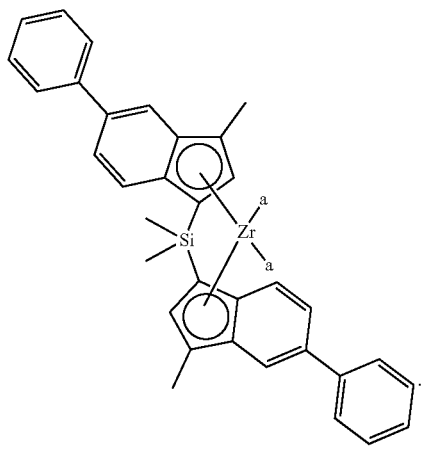
Non-limiting examples of catalyst B are shown below:
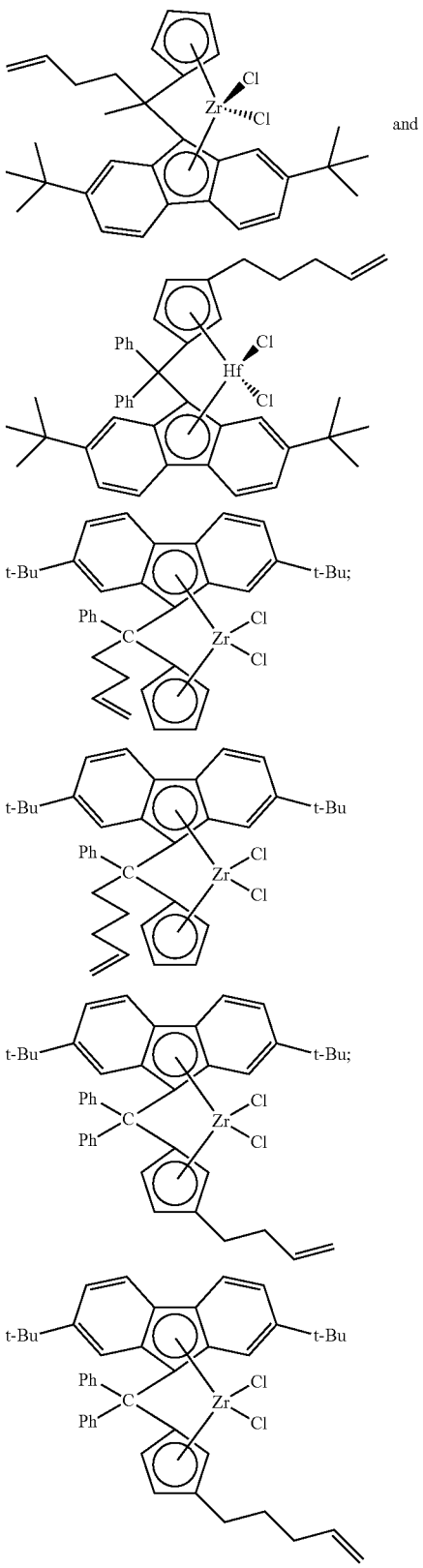

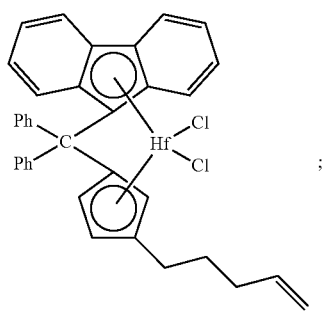
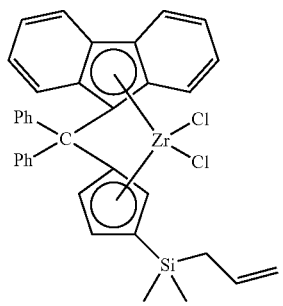
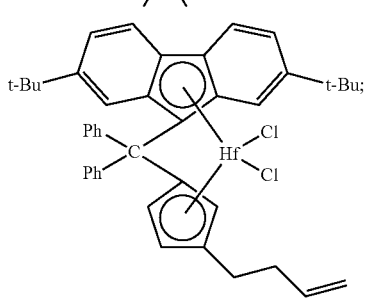
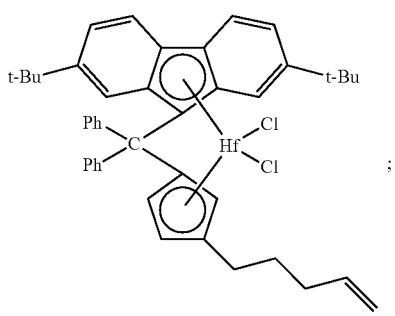
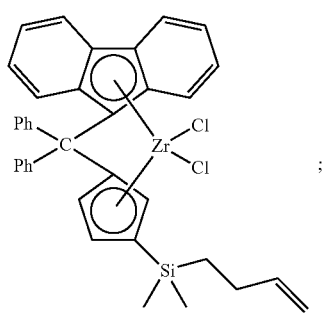
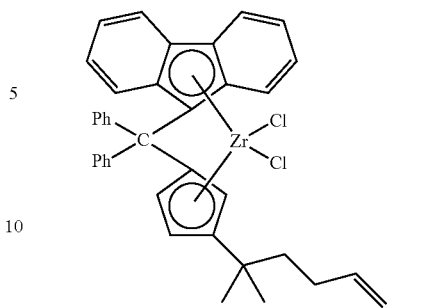
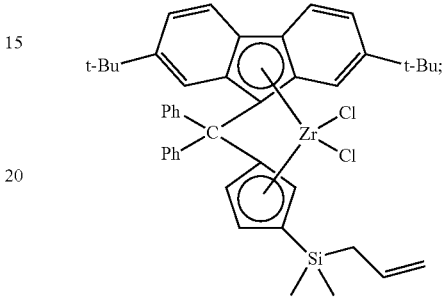
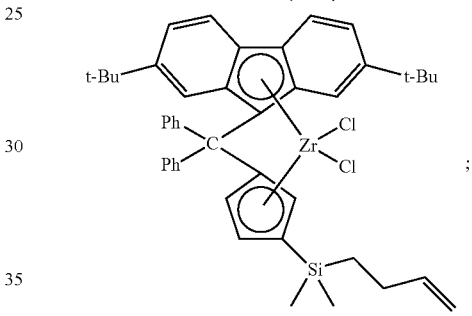
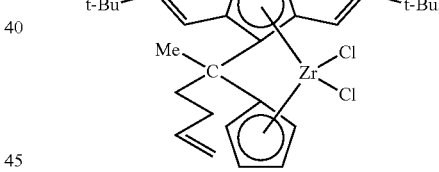
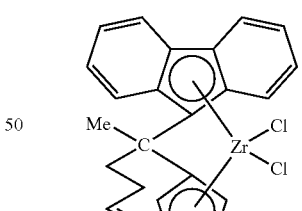
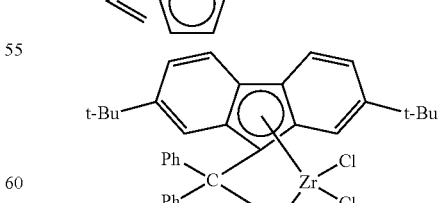
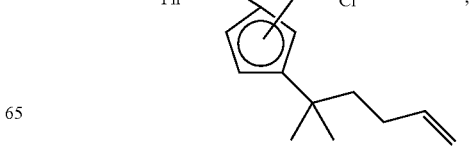

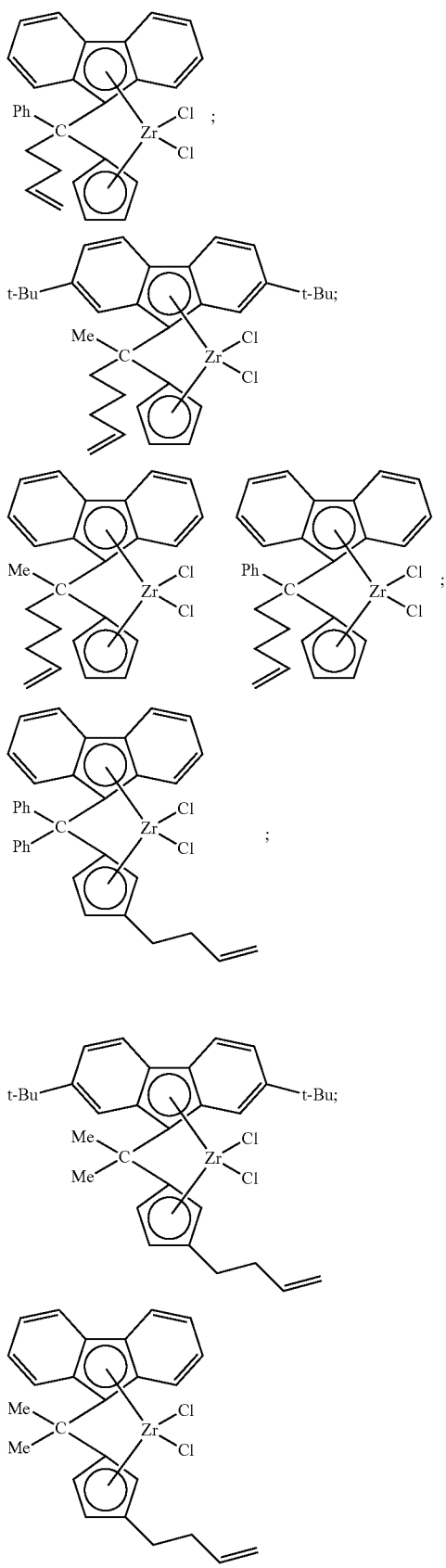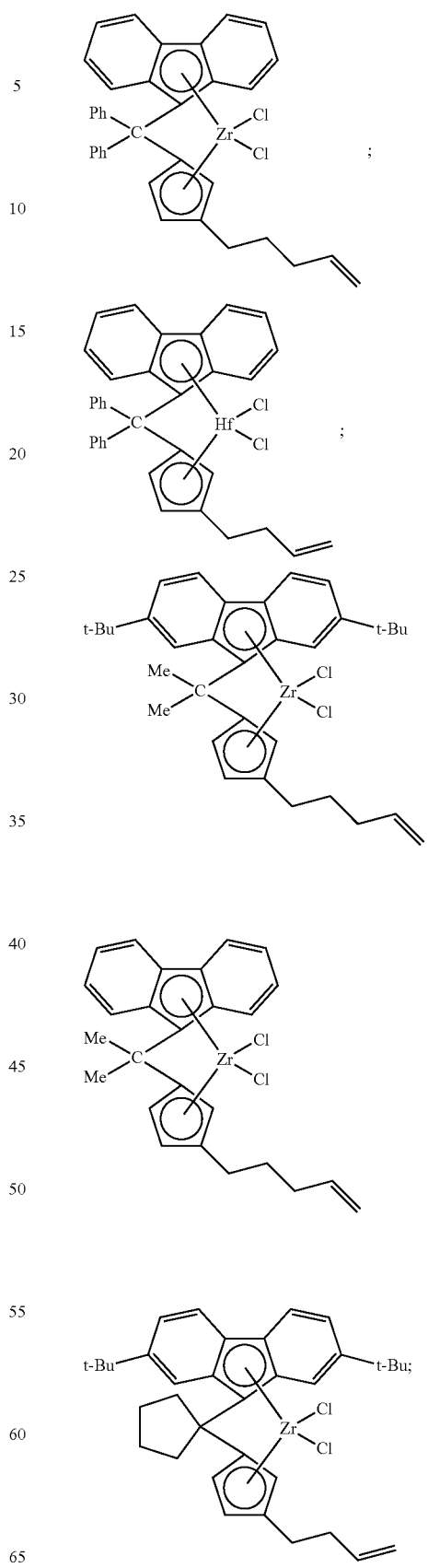

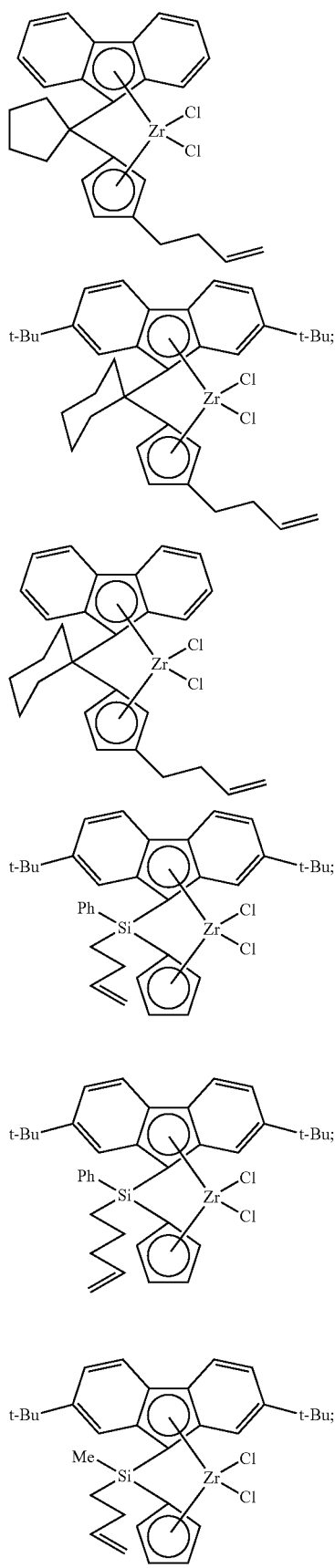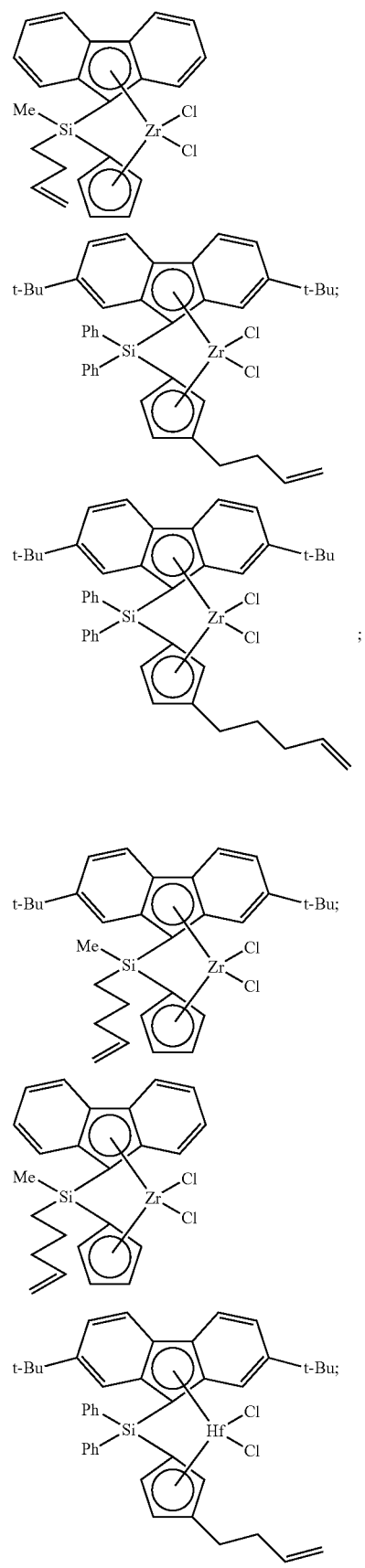

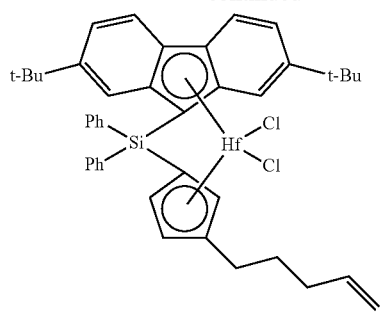
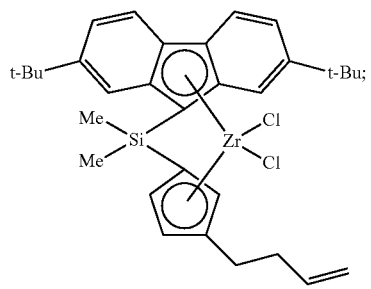
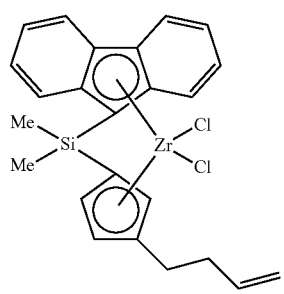
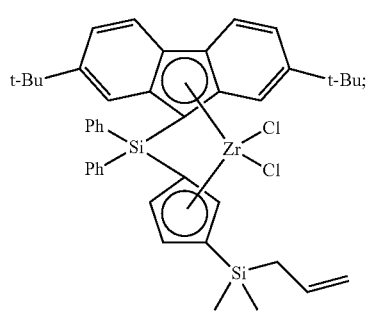
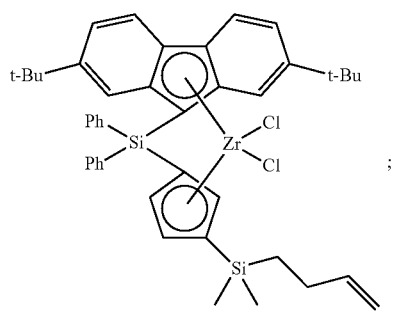
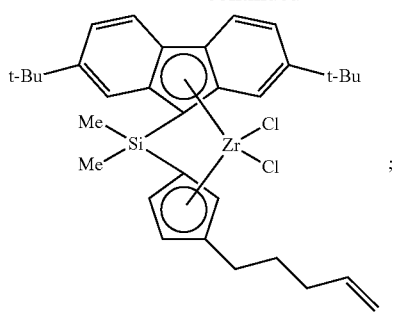
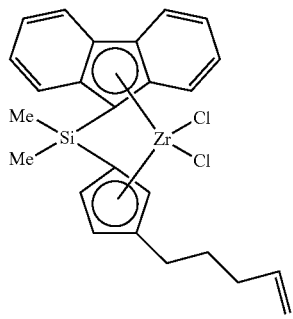
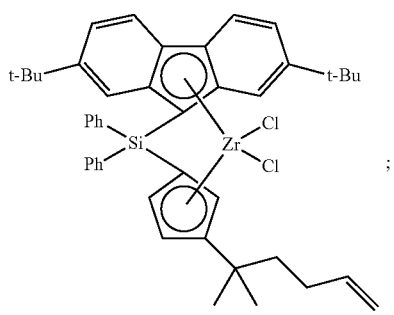
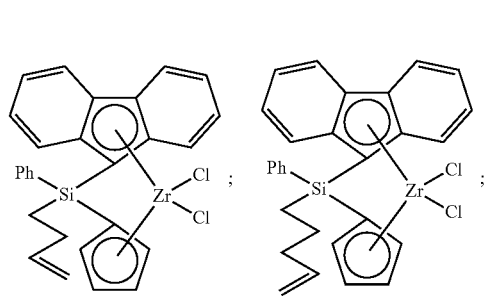
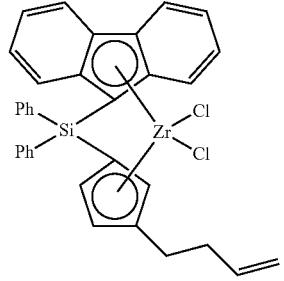

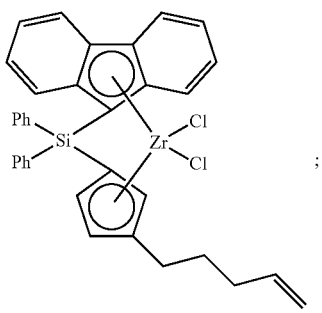

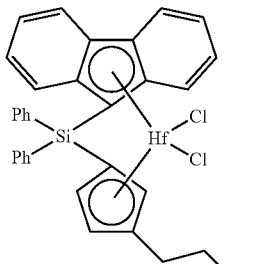

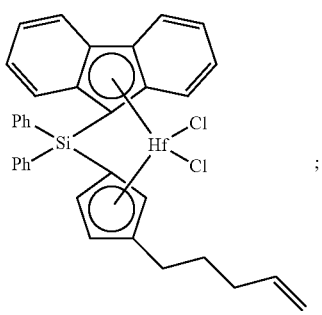

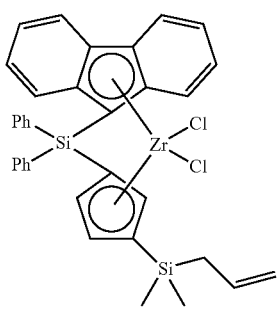

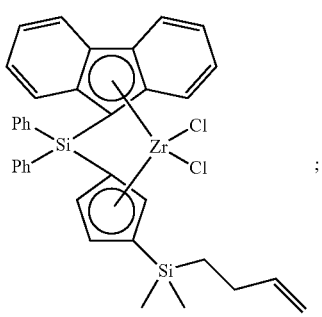

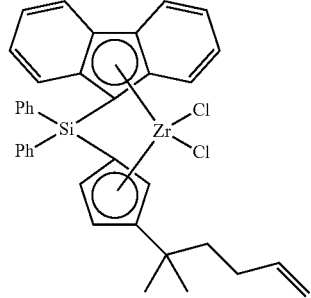

Preferably the metallocene catalyst composition comprises dichloro[rac-ethylenebis(4,5,6-tetrahydro-1-indenyl)]zirconium and (Butenyl)MeC(Cp)(2,7-tBu2-Flu)ZrCl2.

The bridged metallocene catalysts for the metallocene catalyst composition herein are preferably provided on a solid support.

The support can be an inert organic or inorganic solid, which is chemically unreactive with any of the components of the conventional bridged metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. For example the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof, preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof. Most preferred is a titanated silica, or a silica compound. In a preferred embodiment, the bridged metallocene catalysts are provided on a solid support, preferably a titanated silica support, or a silica support. The support may be in granular, agglomerated, fumed or other form.

In some embodiments, the support of the bridged metallocene catalysts is a porous support, and preferably a porous titanated silica, or silica support having a surface area comprised between 200 and 900 m²/g. In another embodiment, the support of the polymerization catalyst is a porous support, and preferably a porous titanated silica, or silica support having an average pore volume comprised between 0.5 and 4 ml/g. In yet another embodiment, the support of the polymerization catalyst is a porous support, and preferably a porous titanated silica, or silica support having an average pore diameter comprised between 50 and 300 Å, and preferably between 75 and 220 Å.

In some embodiments, the support has a D50 of at most 150 μm, preferably of at most 100 μm, preferably of at most 75 μm, preferably of at most 50 μm, preferably of at most 40 μm, preferably of at most 30 μm. The D50 is defined as the particle size for which fifty percent by weight of the particles has a size lower than the D50. The measurement of the particle size can be made according to the International Standard ISO 13320:2009 ("Particle size analysis—Laser diffraction methods"). For example, the D50 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as MasterSizer S), Malvern 2600 and Malvern 3600 series. Such instruments together with their operating manual meet or even exceed the requirements set-out within the ISO 13320:2009 Standard. The Malvern MasterSizer (such as MasterSizer S) may also be useful as it can more accurately measure the D50 towards the lower end of the range e.g. for average particle sizes of less 8 μm, by applying the theory of Mie, using appropriate optical means.

Preferably, the bridged metallocene catalyst is activated by an activator. The activator can be any activator known for this purpose such as an aluminum-containing activator, a boron-containing activator, or a fluorinated activator. The aluminum-containing activator may comprise an alumoxane, an alkyl aluminum, a Lewis acid and/or a fluorinated catalytic support. In some embodiments, alumoxane is used as an activator for the bridged metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the bridged metallocene catalyst. In some embodiments, alumoxanes comprise oligomeric linear and/or cyclic alkyl alumoxanes. In a further embodiment, the alumoxane has formula (V) or (VI)

$$R^a-(Al(Ra)-O)_x-AlR^a_2 \quad (V)$$

for oligomeric, linear alumoxanes; or $$(-Al(R^a)-O)_y \quad (VI)$$

for oligomeric, cyclic alumoxanes
wherein x is 1-40, and preferably 10-20;
wherein y is 3-40, and preferably 3-20; and
wherein each $R^a$ is independently selected from a $C_{1-8}$alkyl, and preferably is methyl. In a preferred embodiment, the alumoxane is methylalumoxane (MAO).

The metallocene catalyst composition may comprise a co-catalyst. One or more aluminumalkyl represented by the formula $AlR^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminums, the most preferred being triisobutylaluminum (TIBAL) and triethylaluminum (TEAL).

In a preferred embodiment, the weight ratio of catalyst component A to catalyst component B is in a range of from 1:9 to 9:1, preferably, 1:5 to 5:1, preferably 1:4 to 4:1.

The present invention also encompasses a continuous process for the preparation of a polyethylene resin according to the first aspect, the process comprising: contacting a catalyst composition with ethylene, optionally hydrogen, and optionally one or more alpha-olefin co-monomers; and polymerizing the ethylene, and the optionally one or more alpha-olefin co-monomers, in the presence of the at least one catalyst composition, and optional hydrogen, thereby obtaining the polyethylene resin having
a molecular weight distribution $M_w/M_n$ lower than 6.5; preferably of at least 3.0 preferably of at least 3.5;
a melt index ranging from an HLMI of at least 1.20 g/10 min to an $MI_2$ of at most 6.0 g/10 min; preferably an HLMI ranging from 1.20 g/10 min to 150 g/10 min, preferably an HLMI ranging from 2.4 to 150 g/10 min, preferably from 3.6 to 120 g/10 min, preferably 4.8 to 110 g/10 min, preferably from 5.0 to 95.0 g/10 min, preferably from 5.0 to 85.0 g/10 min, preferably from 5.0 to 70.0 g/10 min, preferably from 5.0 to 60.0 g/10 min, preferably from 5.0 to 50.0 g/10 min, preferably from 5.0 to 45.0 g/10 min; preferably a melt index $MI_2$ ranging from 0.10 g/10 min to 6.0 g/10 min; preferably from 0.15 to 5.0 g/10 min, preferably 0.20 to 4.5 g/10 min, preferably from 0.20 to 4.0 g/10 min, preferably from 0.20 to 3.5 g/10 min, preferably from 0.20 to 3.0 g/10 min, preferably from 0.20 to 2.5 g/10 min, preferably from 0.20 to 2.0 g/10 min, preferably from 0.20 to 1.8 g/10 min; preferably a melt index ratio HLMI/$MI_2$ below or equal to 30, preferably above 15, preferably above 16, more preferably above 17, for example above 18, for example above 19, for example above 20, preferably from 15 to 30, preferably from 16 to 30, preferably from 17 to 30, for example from 18 to 30, for example from 19 to 30, for example from 20 to 30;
a melt strength of X in Newtons, satisfying the following equations (1) and/or (2)

$$X \text{ is greater than } -0.026 \ln(MI_2)+0.0498 \quad (1)$$

$$X \text{ is greater than } -0.026 \ln(HLMI)+0.1334 \quad (2)$$

preferably a molecular weight distribution $M_z/M_w$ lower than 3.5, preferably lower than 3.3, preferably lower than 3.0;
preferably a rheology long chain branching index grheo of at least 0.65 and at most 0.99, preferably at least 0.71 and at most 0.96, preferably at most 0.95; and
preferably a density of at least 0.905 g/cm³ to at most 0.940 g/cm³, preferably at least 0.910 g/cm³ to at most 0.935 g/cm³, preferably at least 0.913 g/cm³ to at most 0.934 g/cm³, preferably at most 0.932 g/cm³, preferably at most 0.930 g/cm³, preferably at most 0.928 g/cm³, preferably at most 0.925 g/cm³.

Preferably the continuous process comprises the step of comprising: contacting a metallocene catalyst composition with ethylene, optionally hydrogen, and optionally one or more alpha-olefin co-monomers; and polymerizing the ethylene, and the optionally one or more alpha-olefin co-monomers, in the presence of the at least one catalyst composition, and optional hydrogen, thereby obtaining the polyethylene resin of the invention.

More preferably, the continuous process comprises the step of comprising: contacting a metallocene catalyst composition with ethylene, optionally hydrogen, and one or more alpha-olefin co-monomers; and polymerizing the ethylene, and the one or more alpha-olefin co-monomers, in the presence of the at least one metallocene catalyst composition, and optional hydrogen, thereby obtaining the polyethylene resin of the invention.

More preferably, the continuous process comprises the step of comprising: contacting a metallocene catalyst composition with ethylene, optionally hydrogen, and one or more alpha-olefin co-monomers; and polymerizing the ethylene, and the one or more alpha-olefin co-monomers, in the presence of the at least one metallocene catalyst composition, and optional hydrogen, thereby obtaining the polyethylene resin of the invention; wherein said metallocene catalyst composition comprises a catalyst component A and a catalyst component B, wherein catalyst component A comprises a bridged metallocene compound with two tetrahydroindenyl groups, each group being unsubstituted or substituted; and catalyst component B comprises a bridged metallocene compound with a substituted or unsubstituted cyclopentadienyl group and a substituted or unsubstituted fluorenyl group; and an optional activator; an optional support; and an optional co-catalyst.

More preferably, the continuous process comprises the step of comprising: contacting a metallocene catalyst composition with ethylene, optionally hydrogen, and one or more alpha-olefin co-monomers; and polymerizing the ethylene, and the one or more alpha-olefin co-monomers, in the presence of the at least one metallocene catalyst composition, and optional hydrogen, thereby obtaining the polyethylene resin of the invention; wherein said metallocene catalyst composition comprises a catalyst component A and a catalyst component B, wherein catalyst component A comprises a bridged metallocene compound with two tetrahydroindenyl groups, each group being unsubstituted or substituted; and catalyst component B comprises a bridged metallocene compound with a substituted or unsubstituted cyclopentadienyl group and a substituted or unsubstituted fluorenyl group; and an alumoxane activator; a support; and an optional co-catalyst.

The polyethylene resin can be prepared in a continuous process which can be in gas, solution and/or slurry phase. The process can be conducted in one or more slurry loop reactors, gas-phase reactors, continuously stirred tank reactors or a combination thereof. Preferably the continuous process is performed in one or more slurry loop reactor, preferably on single slurry loop reactor, or two or more slurry loop reactors.

As used herein, the terms "loop reactor" and "slurry loop reactor" may be used interchangeably herein. In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

The term "slurry" or "polymerization slurry" or "polymer slurry", as used herein refers to substantially a multi-phase composition including at least polymer solids and a liquid phase, the liquid phase being the continuous phase. The solids may include the catalyst and polymerized monomer.

In some embodiments, the liquid phase comprises a diluent. As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane or hexane.

The polymerization steps can be performed over a wide temperature range. In certain embodiments, the polymerization steps may be performed at a temperature from 20° C. to 125° C., preferably from 60° C. to 110° C., more preferably from 75° C. to 100° C. and most preferably from 78° C. to 98° C. Preferably, the temperature range may be within the range from 75° C. to 100° C. and most preferably from 78° C. to 98° C. Said temperature may fall under the more general term of polymerization conditions.

In certain embodiments, in slurry conditions, the polymerization steps may be performed at a pressure from about 20 bar to about 100 bar, preferably from about 30 bar to about 50 bar, and more preferably from about 37 bar to about 45 bar. Said pressure may fall under the more general term of polymerization conditions.

The present invention also encompasses a polyethylene composition comprising the polyethylene resin of the invention and one or more additives.

The additives can be for example antioxidants, UV stabilizers, pigments, processing aids, acid scavengers, lubricants, antistatic agents, fillers, nucleating agents, or clarifying agents, or combination thereof. An overview of useful additives is given in Plastics Additives Handbook, ed. H. Zweifel, 5$^{th}$ edition, Hanser Publishers. These additives may be present in quantities generally between 0.01 and 10 weight % based on the weight of the polyethylene composition. After the polyethylene resin is produced, it may be formed into various articles. In view of its melt strength properties, the polyethylene resin is particularly suited for articles such as film products, caps and closures, grass yarns, rotomoulded articles, blow moulded articles, pipes, fibers, etc.

The present invention therefore also encompasses an article comprising a polyethylene resin as defined herein; or obtained according to a process as defined herein. In some embodiments, said article can be film products, caps and closures, rotomoulded article, fibers, pipes, blow moulded articles, etc., preferably a film. Preferred embodiments for polyethylene resin of the invention are also preferred embodiments for the article of the invention.

The invention also encompasses a process for preparing an article according to the invention. Preferred embodiments as described above are also preferred embodiments for the present process.

The polyethylene resin composition according to the invention is particularly suitable for film applications i.e. to prepare films. In particular, it provides a good balance in both mechanical and optical properties.

The present invention therefore also encompasses a film comprising or consisting essentially of a metallocene-catalyzed polyethylene resin according to the invention. The film can be a cast or blown film. The invention also covers the process to prepare the films. The same conditions and properties apply as for the polyethylene resin composition.

The film can have an Elmendorf tear strength in the machine direction of at least 38 N/mm, preferably of at least 40 N/mm, preferably at least 45 N/mm as measured according to ASTM D 1922:2015, on a blown film 40 μm thick prepared using a blown film line equipment having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

The Elmendorf tear strength of the film prepared with the resin composition according to the invention in the transverse direction can be preferably of at least 90 N/mm, more preferably from 95 N/mm, even more preferably at least from 100 N/mm, and most preferably at least from 110 N/mm, as measured according to ASTM D 1922:2015, on a blown film 40 μm thick prepared using a blown film line equipment having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

In an embodiment, the film has a gloss of at least 40 measured according to ASTM D-2457:2013 at an angle of 45°, at a thickness of 40 μm, more preferably a gloss of at least 45, preferably at least 50.

In an embodiment, the film has a haze average of less than 20% measured according to ISO 14782:1999, at a thickness of 40 μm, more preferably a haze of less than 19%, preferably less than 17%, preferably less than 16%, preferably less than 15%, preferably less 13%.

In some embodiments, when the film is made of polyethylene resins of the invention, having a $MI_2$ ranging from 0.1 to 2.0 g/10 min and a density ranging from 0.900 to 0.930 g/cm$^3$, said film can have a Dart/thickness (g/μm)>8×10$^{-5}$× density$^{-149.5}$.

Blown films may include, for example, films used as geoliners, i.e., in-ground liners used to prevent contamination of surrounding soil and groundwater by materials found in, and leaching from, for example, trash collection and chemical dump sites. Other blown film applications include apparel bags and/or coverings, bread bags, produce bags and the like. The polyethylene resins may be used in a wide variety of thicknesses and as one or more layers of a multi-layer film construction. In other embodiments they may be used as coatings or may, as films, be coated or subjected to fluorination or other treatments to increase their barrier potential for these and other uses. The films are also suitable for use in or as articles designed for packaging in particular food packaging, construction, insulation, and as laminating films etc. Any known film blowing line equipment can be used to prepare blown films comprising the resin composition of this invention, for example Macchi®'s COEX FLEX®, or Windmöller & Hölscher VAREII, or Windmöller & Hölscher OPTIMEX Blown Film Lines. The process parameters which can be used are well-known to the person skilled in the art depending on the desired application of the film. For example: The die diameter can vary from 50 to 2000 mm. For example, 50 mm would be used for smaller film applications e.g. pouches for instance for medical purposes, and on the other hand 2000 mm would be used for larger applications, such as agricultural film applications. The blow-up ratio (BUR) can be of 1 to 5. The die-gap can be of 0.8 to 2.6 mm. The throughput can be of 10 kg/h to 2000 kg/h. The extrusion screw can have a diameter of from 30 mm to 150 mm. Preferably, the screw is a barrier screw.

The resins can also be used to prepare cast films. Typical cast film equipment can be provided by Dolci, SML, Windmöller & Hölscher, or COLINES, etc. Again, the skilled person would know how to run the cast film line to obtain the best possible results.

In some embodiments, the film can be 10 μm to 500 μm thick, more preferably 10 to 100 μm, most preferably 10 to 75 μm.

The polyethylene resins according to the invention can be used to prepare films, which can be monolayer or multilayer films Monolayer films can be prepared essentially from the polyethylene resin according to the invention i.e. the film can comprise at least 70% by weight of the polyethylene resin of the invention based on the total weight of the film. In a multilayer film, the polyethylene resin composition according to the invention can be used in one or several layers, in varying concentrations, alone or combination with other resins.

The present invention also relates to yarns made with the polyethylene resin according the invention, in particular to slit film and monofilaments suitable for tufting artificial grass also known as artificial turf. The present invention also encompasses artificial grass tufted from slit film or monofilaments comprising the polyethylene resin according to the first aspect of the invention. The present invention encompasses a yarn and preferably an artificial grass comprising the polyethylene resin. The polyethylene resin for the slit film and monofilaments for the artificial grass may additionally contain usual additives well known to those skilled in the art such as antioxidants, UV-stabilizers, processing aids, fillers, flame retardants, pigments or similar. These additives may be present in quantities generally between 0.01 and 15 weight % based on the weight of the polyethylene resin. The yarns (slit film and monofilaments) are suitable for use in artificial turf or grass including synthetic sporting surfaces. The slit film or monofilament or similar according to all aspects of the present invention may typically be in stretched form. In some embodiments, a typical process for manufacturing a slit film or monofilament comprises the steps of:
  providing the polyethylene resin to an extruder; and
  extruding the polyethylene resin through a die to form an extruded film or monofilament;
  solidifying the film or monofilament, preferably by contacting said film or monofilament to a cooled surface, for example by contacting it with a chilled roll, or by guiding it through a water bath;
  slitting said solidified film into slit film or tapes;
  drawing in the solid state said slit films or monofilaments in the longitudinal or machine direction, with a draw ratio in the range 1:3 to 1:8, preferably 1:3 to 1:6, more preferably 1:3 to 1:5;
  optionally annealing the slit films or monofilaments, preferably in an annealing oven.

The invention also encompasses the use of a polyethylene resin according to the invention, in film applications, such as blown film and cast films, grass yarn applications, injections applications, blow molding applications, extrusion applications, in polyethylene of raised temperature resistance (PE-RT), etc.

The invention will now be illustrated by the following, non-limiting illustrations of particular embodiments of the invention.

Examples

Test Methods

The density was measured according to the method of standard ISO 1183-1:2012 method A at a temperature of 23° C.

The melt flow rate $MI_2$ was measured according to ISO 1133:1997, condition D, at 190° C. and under a load of 2.16 kg.

The melt flow rate $MI_5$ was measured according to ISO 1133:1997, condition T, at 190° C. and under a load of 5 kg.

The melt flow rate HLMI or $MI_{21}$ was measured according to ISO 1133:1997, condition G, at 190° C. and under a load of 21.6 kg.

The molecular weight ($M_n$ (number average molecular weight), $M_w$ (weight average molecular weight) and molecular weight distributions d ($M_w/M_n$), and d' ($M_z/M_w$) were determined by size exclusion chromatography (SEC) and in particular by IR-detected gel permeation chromatography (GPC). Briefly, a GPC-IR5 from Polymer Char was used: 10 mg polymer sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight $M_i$ of each fraction i of eluted polymer is based on the Mark-Houwink relation ($\log_{10}(M_{PE})=0.965909\times\log 10(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\Sigma_i N_i M_i}{\Sigma_i N_i} = \frac{\Sigma_i W_i}{\Sigma_i W_i/M_i} = \frac{\Sigma_i h_i}{\Sigma_i h_i/M_i}$$

$$M_w = \frac{\Sigma_i N_i M_i^2}{\Sigma_i N_i M_i} = \frac{\Sigma_i W_i M_i}{\Sigma_i W_i} = \frac{\Sigma_i h_i M_i}{\Sigma_i h_i}$$

$$M_z = \frac{\Sigma_i N_i M_i^3}{\Sigma_i N_i M_i^2} = \frac{\Sigma_i W_i M_i^2}{\Sigma_i W_i M_i} = \frac{\Sigma_i h_i M_i^2}{\Sigma_i h_i M_i}$$

Here $N_i$ and $W_i$ are the number and weight, respectively, of molecules having molecular weight $M_i$. The third representation in each case (farthest right) defines how one obtains these averages from SEC chromatograms. hi is the height (from baseline) of the SEC curve at the $i_{th}$ elution fraction and $M_i$ is the molecular weight of species eluting at this increment.

Co-monomer distribution, illustrated by the $CH_3/CH_2$ ratio across the molecular weight distribution was also determined using the SEC apparatus described above equipped with an integrated high-sensitivity multiple band IR detector (IR5-MCT) as described by A. Ortin et al. (Macromol. Symp. 330, 63-80 2013 and T. Frijns-Bruls et al. Macromol. Symp. 356, 87-94 2015). The co-monomer distribution can be determined by the ratio of the IR detector intensity corresponding to the $CH_3$ and $CH_2$ channels calibrated with a series of PE homo/copolymer standards whose nominal value are predetermined by NMR or FTIR. The ratio of infra-red absorbance band ratio $A_{CH3}$ to $A_{CH2}$ (methyl over methylene sensitive channels) can be correlated to the methyl (CH3) per 1000 total carbons (1000TC), denoted as CH3/1000TC, as a function of molecular weight. The IR $CH_3/CH_2$ ratio of the polymer was obtained by considering the entire signals of the $CH_3$ and CH2 channels between the integration limits of the concentration chromatogram:

IR ratio=Area of $CH_3$ signal within integration limits/area of $CH_2$ signal within integration limits. In the present invention, an increase of the area ratio $CH_3/CH_2$ means an increase in Short Chain Branching content.

Rheology long chain branching index $g_{rheo}$ was measured according to the formula, as described in WO 2008/113680:

$$g_{rheo}(PE) = \frac{M_w(\text{SEC})}{M_w(\eta_o, MWD, SCB)}$$

wherein $M_w$ (SEC) is the weight average molecular weight obtained from size exclusion chromatography expressed in kDa; and wherein $M_w$ ($\eta_0$, MWD, SCB) is determined according to the following, also expressed in kDa:

$M_w(\eta_0,MWD,SCB)=\exp(1.7789+0.199769\ LnM_n+0.209026(Ln\eta_0)+0.955(\ln p)-0.007561(LnM_z)(Ln\eta_0)+0.02355(\ln M_z)^2)$ wherein the zero shear viscosity $\eta_0$ in Pa·s is obtained from a frequency sweep experiment combined with a creep experiment, in order to extend the frequency range to values down to $10^{-4}$ s$^{-1}$ or lower, and taking the usual assumption of equivalence of angular frequency (rad/s) and shear rate; wherein zero shear viscosity no is estimated by fitting with Carreau-Yasuda flow curve ($\eta$-W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%; wherein the apparatus used is an AR-G2 manufactured by TA instruments.

The total co-monomer content, especially 1-hexene (wt % C6) relative to the total weight of the ethylene polymer and the molar fraction of hexene co-monomer in sequences of length one relative to the co-monomer content are determined by $^{13}$C NMR analysis according to the state of the art of $^{13}$C NMR analysis of ethylene based polyolefins.

The $^{13}$C NMR analysis was performed under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data were acquired using proton decoupling, several hundred even thousands scans per spectrum, at a temperature of 130° C. The sample was prepared by dissolving a sufficient amount of polymer in 1,2,4-trichlorobenzene (TCB 99% spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 to 600 mg of polymer were dissolved in 2.0 ml of TCB, followed by addition of 0.5 ml of C6D6 and 2 to 3 drops of HMDS. The chemical shifts are referenced to the signal of the internal standard HMDS, which is assigned a value of 2.03 ppm. $^{13}$C NMR observed signals are assigned according to the co-monomer involved and corresponding literature. The following non-exhaustive literature references can be used: G. J. Ray et al. in Macromolecules, vol 10, no 4, 1977, p. 773-778 and Y. D Zhang et al in Polymer Journal, vol 35, no 7, 2003, p. 551-559. The total co-monomer content relative to the total weight of ethylene polymer is determined from the appropriate peaks area combination, a well-known method to the skilled person.

The melt strength (also referred as strength at break) was measured with a Göttfert Rheotens Melt Strength device, model 71-97, in combination with Rheograph Göttfert RG50, both manufactured by Göttfert under the following testing conditions: Rheograph Göttfert (RG50)=Die geometry (UD): 30 mm/2 mm, 180° entrance angle; barrel+die temperature: 190° C.; Piston diameter 12 mm, Piston speed: 0.25 mm/s. Rheotens (model 71-97) Wheels: standard (ridged wheels); Wheel gap: 0.4 mm; Wheel acceleration: 2 mm/s$^2$, Strand length: 100.0 mm, Wheel initial speed Vo: 9.0 mm/s. In the Rheotens test, the tensile force required for extension/stretching of an extruded melt filament exiting a capillary die is measured as a function of the wheel take-up velocity that increases continuously at a constant acceleration speed. The tensile force typically increases as the wheel (roller) velocity is increased and above a certain take-up velocity the force remain constant until the filament (strand) breaks.

For each material, Rheotens curves are generate to verify data reproducibility. Polymer was loaded into the barrel and allowed to melt for 360 seconds at 190° C. before beginning the testing. In fact, the complete amount of material present in the barrel of the Rheograph is extruded through the die and is being picked up by the wheels of the Rheotens device. The strand is let to stabilize between the wheels turning at 9 mm/s, once the strand is stabilized, the force is calibrated to 0 N and the acceleration of the wheels is started. Once the test is started, the speed of the wheels is increased with a 2.0 mm/s$^2$ acceleration and the tensile force is measured for each given speed. After each strand break, or strand slip between the wheels, the measurement is stopped and the material is placed back between the wheels for a new measurement. A new Rheotens curve is recorded. Measuring continues until all material in the barrel is consumed. In this invention, the average of the tensile force vs. draw ratio for each material is reported.

The Dart impact strength was measured according to ISO 7765-1:2005, method A (diameter of the hammer 38.1 mm, fall height 66 cm) at 23° C. with 50% humidity. Dart impact strength are measured on 40 µm thick blown film prepared using a blown film line equipment having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

Tear resistance (determined as Elmendorf tear [N]): Applies for the measurement both in machine direction (MD) and in transverse direction (TD). The tear strength is measured using the ASTM D 1922:2015 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film. The measurements of Elmendorf tear strength were carried out according to ASTM D 1922:2015, on a blown film 40 µm thick prepared using a blown film line equipment having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

Haze in % was measured according to ISO 14782:1999, at a thickness of 40 µm. Gloss was measured according to ASTM D-2457:2013 at an angle of 45°. It was measured using a Byk-Gardner micro-gloss reflectometer. Both gloss and haze were measured on 40 µm thick blown film prepared using a blown film line equipment having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

Structure of Catalysts:
1. Metallocene 1:

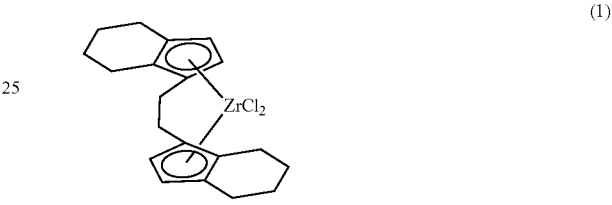

Dichloro[rac-ethylenebis(4,5,6-tetrahydro-1-indenyl)]zirconium was purchased from Boulder Scientific Company (CAS 100163-29-9).

2. Metallocene 2: (Butenyl)MeC(Cp)(2,7-tBu2-Flu)ZrCl2

Metallocene 2 was prepared as described below, following the synthesis described in Journal of Organometallic Chemistry vol. 553, 1998, p. 205-220:

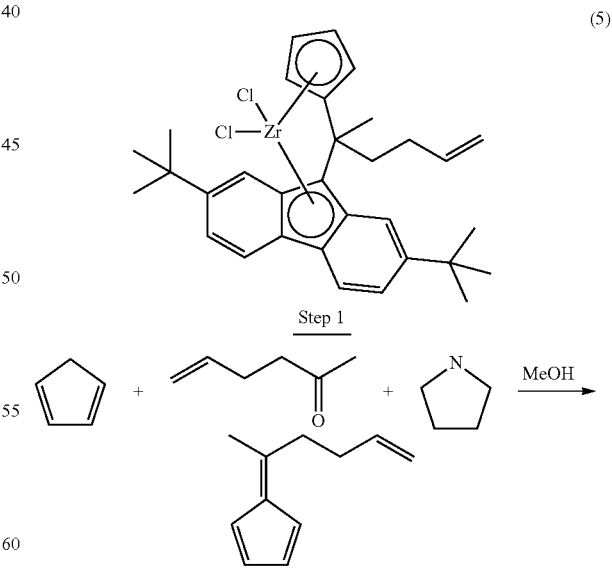

Into a 200 mL 3-neck flask equipped with a gas inlet tube and a magnetic stirring bar was charged, under nitrogen, 2.5 eq of freshly cracked cyclopentadiene and 1 eq of 5-hexene-2-one in 60 mL of methanol. Then, 2 eq of pyrrolidine was added dropwise at 0° C. and the mixture was stirred overnight at room temperature. The reaction was quenched with 50 mL of HCl 1M and extracted with Et$_2$O (3×50 mL). Organic fractions were dried over MgSO$_4$ and solvent was removed under reduced pressure. The fulvene was obtained as a yellow oil and used without further purification (Yield=65%).

Step 2:

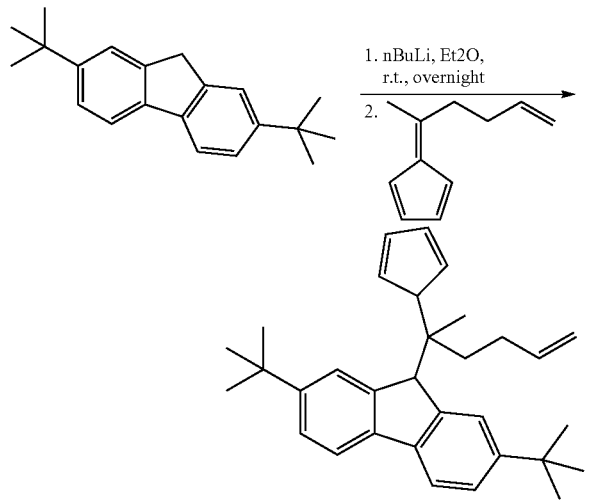

In a 3-neck flask, 1 eq of di-tert-butylfluorene was added under flow of nitrogen and dissolved in 70 mL of Et$_2$O. 1.1 eq of n-BuLi (1.6 M in hexane) was added dropwise at 0° C. to this solution and the mixture was stirred overnight at room temperature. A solution of 3.5 g of fulvene prepared in the previous step, dissolved in 30 mL of Et$_2$O was added dropwise. The reaction mixture was allowed to stir overnight. Reaction was quenched with water and extracted with Et$_2$O (3×50 mL). Combined organic fractions were dried over MgSO$_4$ and solvent was removed under reduced pressure. The product was crystallized in pentane/MeOH at 0° C. to afford a white solid (Yield=85%).

Step 3:

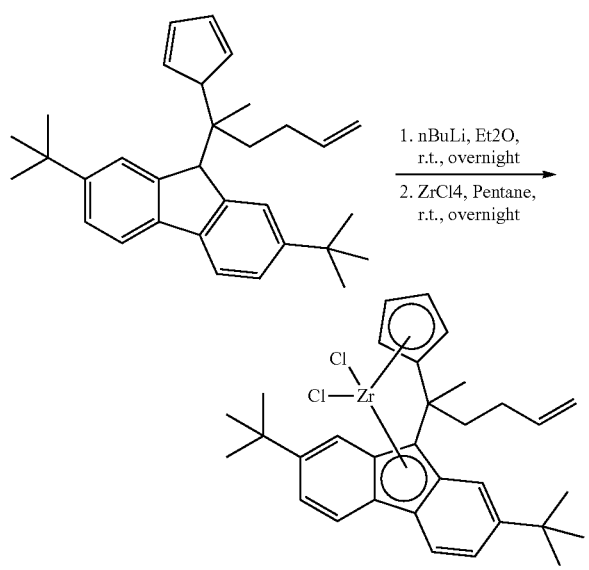

In a round-bottomed flask, 1 g of ligand was introduced and dissolved in 40 mL of Et$_2$O. 2.1 eq. of nBuLi was added dropwise and the mixture was stirred overnight at room temperature. Solvent was removed under vacuum and 40 mL of dry pentane was added. Then 1 eq of ZrCl4 was added in small portions at room temperature. The reaction was stirred over 2 days and filtered. The resulting precipitate was diluted in DCM and centrifuged to eliminate lithium chloride. Solvent was removed under vacuum to afford a pink-red powder (Yield=70%).

$^1$H NMR (500 MHz, CD$_2$Cl$_2$) δ1.34 (s, 9H, CH$_3$ tBu); 1.36 (s, 9H, CH$_3$ tBu); 2.30 (m, CH$_2$ alk); 2.43 (s, 3H, CH$_3$); 2.55 (m, 1H, CH$_2$ alk.); 2.65 (m, 1H, CH$_2$ alk.); 3.25 (m, 1H, CH$_2$ alk.); 5.13 (m; 1H, CHvinyl); 5.18 (m; 1H, CHvinyl); 5.70 (m, 2H, CHcp); 6.10 (m; 1H, CHvinyl); 6.29 (m, 2H, CHcp); 7.55 (s, 1H, CHflu), 7.63-7.68 (m, 2H, CHflu); 7.72 (s, 1H, CHflu); 8.00-8.04 (m, 2H, CHflu)

3. Synthesis of Supported Catalysts

All catalyst and co-catalyst experimentations were carried out in a glove box under nitrogen atmosphere. Methylaluminoxane (30 wt %) (MAO) in toluene from Albemarle was used as the activator. Titanated silica from PQ (PD12052) was used as catalyst support (D50: 25 μm). Supported metallocene catalysts were prepared in two steps using the following method:

1. Impregnation of MAO on Silica:

Ten grams of dry silica (dried at 450° C. under nitrogen during 6 h) was introduced into a round-bottomed flask equipped with a mechanical stirrer and a slurry was formed by adding 100 ml of toluene. MAO (21 ml) was added dropwise with a dropping funnel. The reaction mixture was stirred at 110° C. during 4 hours. The reaction mixture was filtered through a glass frit and the powder was washed with dry toluene (3×20 ml) and with dry pentane (3×20 ml). The powder was dried under reduced pressure overnight to obtain a free flowing grey powder.

2. Deposition of Metallocene on Silica/MAO Support:

Silica/MAO (10 g) was suspended in toluene (100 ml) under nitrogen. Metallocenes 1 and 2 (total amount of metallocene=0.2 g) were introduced and the mixture was stirred 2 hours at room temperature. The reaction mixture was filtered through a glass frit and the powder was washed with dry toluene (3×20 ml) and with dry pentane (3×20 ml). The powder was dried under reduced pressure overnight to obtain a free flowing grey powder.

The catalyst compositions prepared are shown in Table 1.

TABLE 1

| Catalyst Composition | catalysts | Ratio catalyst 1:catalyst 2 |
| --- | --- | --- |
| 1 | Met 1/Met 2 | 1:1 |
| 2 | Met 1/Met 2 | 1:1.5 |

4. Polymerizations

Polymerization reactions using the catalyst compositions shown in Table 1 were performed in a single slurry loop reactor with isobutane as diluent.

All polymerizations were performed under the conditions depicted in table 2.

TABLE 2 operating conditions and analytical results for each of the resins

| | | | Example 1 | Example 2 | Example 3 | Example 4 | Example 5 | Example 6 |
|---|---|---|---|---|---|---|---|---|
| Loop reactor OPERATING CONDITIONS | TEMP. | (° C.) | 75 | 77 | 77 | 77 | 86 | 82 |
| | Tibal | (ppm) | 106 | 103 | 93 | 106 | 122 | 112 |
| | Cat composition | | 1 | 1 | 1 | 1 | 2 | 1 |
| | C6— | (kg/h) | 5.4 | 4.9 | 4.5 | 4.2 | 1.6 | 3.5 |
| | H2 | (Nl/h) | 47.6 | 36 | 24.5 | 12.7 | 16 | 28.3 |
| | C2-OffGas | (wt %) | 7.15 | 7.27 | 7.25 | 7.07 | 7.24 | 7.42 |
| | C6-OffGas | (wt %) | 3.6 | 3.29 | 3.14 | 2.99 | 1.4 | 3.09 |
| | C6-/C2-OffGas | | 0.5 | 0.45 | 0.43 | 0.42 | 0.19 | 0.41 |
| | Residence time | (min) | 58 | 59 | 59 | 59 | 61 | 62 |
| | Productivity | (g/g) | 6563 | 6873 | 7246 | 7419 | 8884 | 8970 |
| | Activity | (g/g/% C2—) | 944 | 965 | 1019 | 1065 | 1208 | 1209 |
| | D50 | (μm) | 501 | 528 | 592 | 630 | 503 | 557 |
| | C6 | wt % | 6.4 | 9.8 | 8.8 | 8.1 | 7.5 | 3.1 |
| | GPC | $M_n$ (g/mol) | 19189 | 21636 | 24885 | 30730 | 29913 | 23225 |
| | | $M_w$ (g/mol) | 86832 | 98358 | 109985 | 131002 | 115751 | 111046 |
| | | $M_z$ (g/mol) | 238549 | 273636 | 306364 | 347762 | 297080 | 312330 |
| | | D | 4.5 | 4.5 | 4.4 | 4.3 | 3.9 | 4.8 |
| | | D' | 2.7 | 2.8 | 2.8 | 2.7 | 2.6 | 2.8 |

The polymerization results are shown in Table 3, and compared with the following commercially available comparative examples: Comp 1: Lumicene® Supertough 22ST05 is a polyethylene blown film grade commercially available from Total Refining & Chemicals; Comp 2: Lumicene® Supertough 32ST05 is a polyethylene blown film grade commercially available from Total Refining & Chemicals; Comp 3: Lumicene mPE M 1810EP is a metallocene based Linear Low Density Polyethylene with hexene as co-monomer commercially available from TOTAL Refining & Chemicals; Comp 4 is a typical metallocene catalyzed polyethylene grade from competition; Comp 5, Comp 6, Comp 7 are typical multimodal metallocene catalyzed polyethylene grades from competition.

Figure 2:
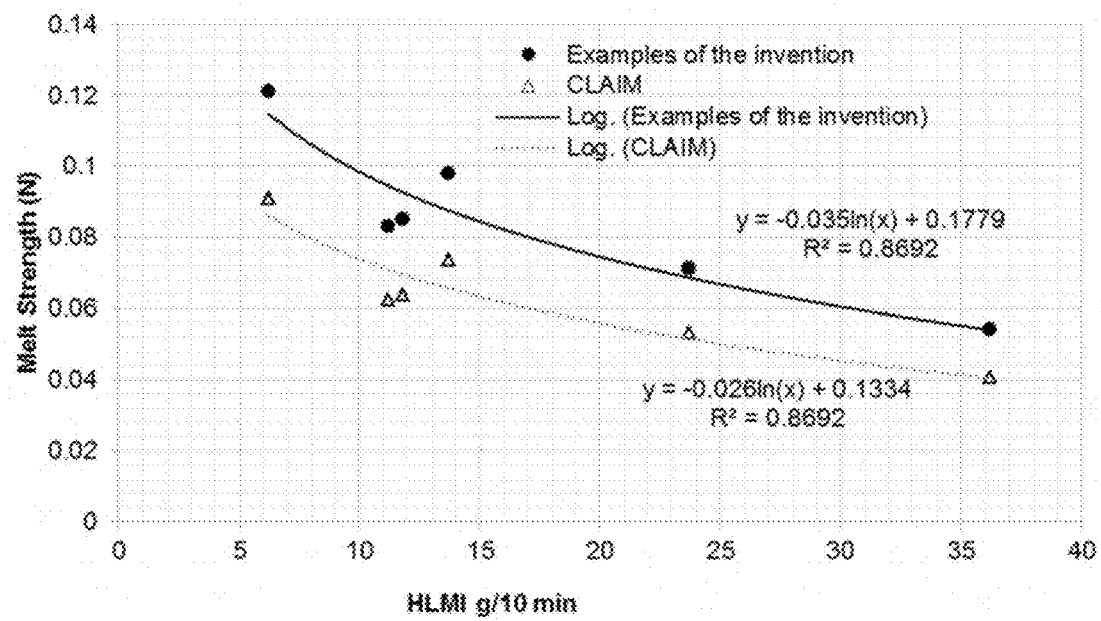
FIG. 2 represents a graph plotting the melt strength of several polyethylene resins as a function of the melt index HLMI.

The melt strength as a function of the melt flow of the comparative examples was compared with the melt strength of the examples of the invention (Table 3). FIG. 1 is a plot of the peak melt strength versus the melt index $MI_2$ for the samples of Table 3, and shows that, in contrast with the comparative examples, the inventive polyethylene resins (Examples 1 to 6) have a melt strength, at 190° C., greater than $MS > 0.0498 - 0.026 \times \ln MI_2$. FIG. 2 is a plot of the peak melt strength versus the melt index HLMI for the samples of Table 3, and shows that, the inventive polyethylene resins (Examples 1 to 6) have melt strength, at 190° C., greater than $> 0.1334 - 0.026 \times \ln$ HLMI.

Figure 3:
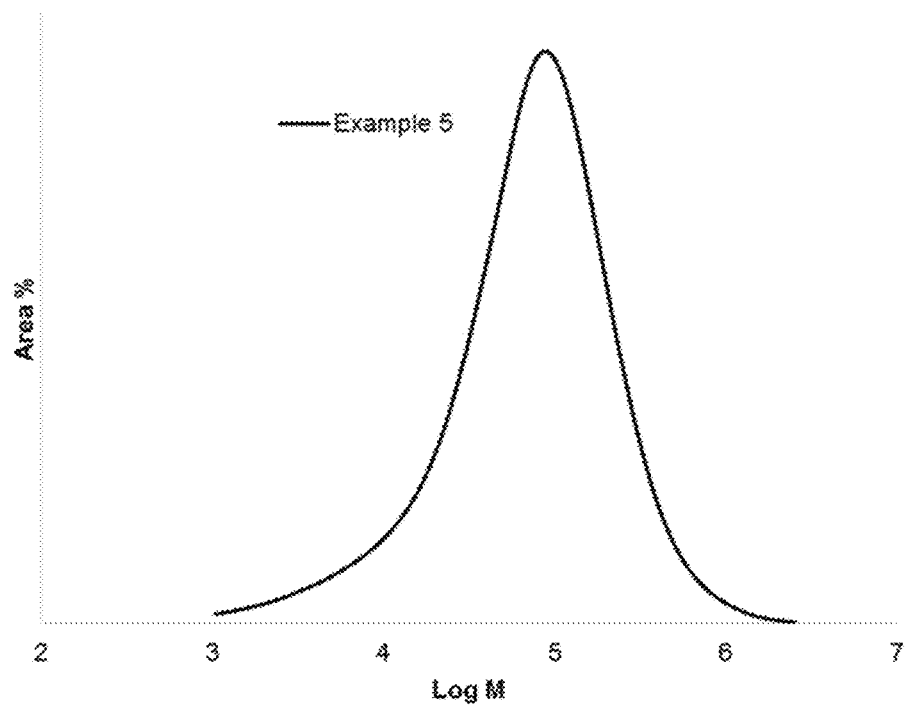
FIG. 3 represents a graph plotting the molecular weight distribution (weight fraction (area normalized) as a function of logarithm of molecular weight) of polyethylene resin of example 5.
Figure 4:
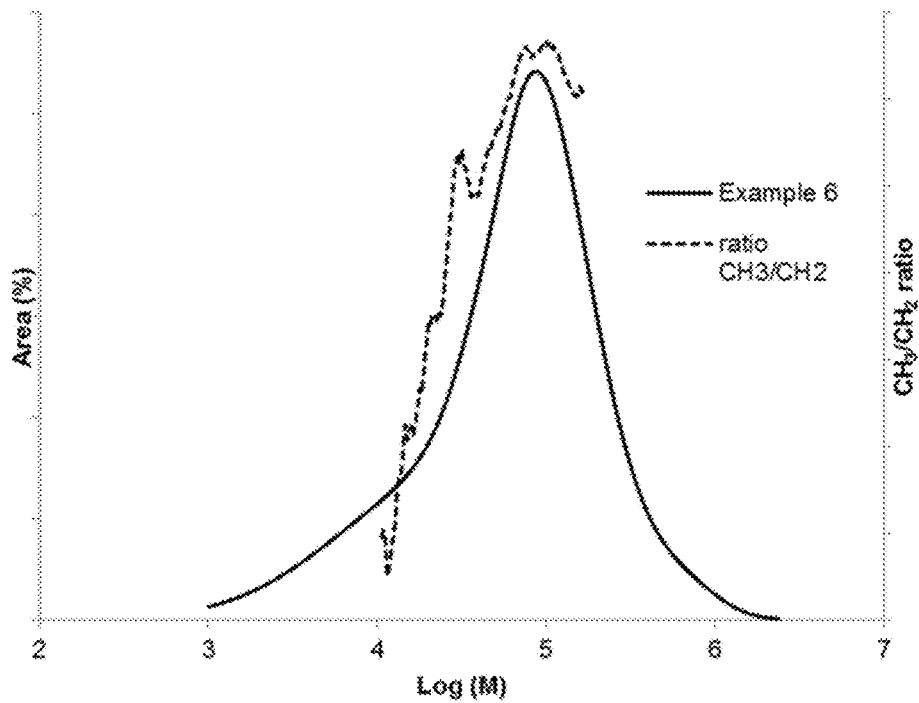
FIG. 4 represents a graph plotting the molecular weight distribution (weight fraction (area normalized) as a function of logarithm of molecular weight) and the ratio of the areas of IR signals ($A_{CH3}/A_{CH2}$) from IR5-MCT detector as function of log M of polyethylene resin of example 6.

The molecular weight distribution curve of Examples 5 and 6 as determined by Gel Permeation Chromatography (GPC) is shown in FIGS. 3 and 4, respectively. The areas of IR signals ($ACH_3/ACH_2$) from IR5-MCT detector as function of log M was determined for Example 6. In the present invention, an increase of the area ratio $CH_3/CH_2$ means an increase in Short Chain Branching content. FIG. 4 shows that Example 6 exhibits a reverse co-monomer distribution.

The polyethylene resin were transformed into 40 μm thick blown films using a blown film line equipment from Macchi® having a low neck configuration with a extrusion screw diameter of 45 mm, a length to diameter ratio of the screw of 30, a die diameter of 120 mm, a blow-up ratio (BUR) of 2.5, a die gap of 1.4 mm, and cooling air at a temperature of 20° C.

The mechanical and optical properties can be found in Table 4.

TABLE 3

| | Example 6 | Example 1 | Example 2 | Example 3 | Example 4 | Example 5 | Comp 1: 22ST05 | Comp 2: 32ST05 | Comp 3: M 1810EP | Comp 4 | Comp 5 | Comp 6 | Comp 7 |
|---|---|---|---|---|---|---|---|---|---|---|---|---|---|
| Density g/cm³ | 0.922 | 0.916 | 0.916 | 0.916 | 0.917 | 0.930 | 0.919 | 0.931 | 0.918 | 0.938 | 0.916 | 0.918 | 0.935 |
| $MI_2$ g/10 min | 0.51 | 1.5 | 0.88 | 0.5 | 0.22 | 0.51 | 0.45 | 0.48 | 0.87 | 0.23 | 0.48 | 1.42 | 1.33 |
| $MI_5$ g/10 min | 1.4 | 4.5 | 2.6 | 1.6 | 0.70 | 1.5 | nm | nm | nm | nm | nm | nm | nm |
| HLMI g/10 min | 11.8 | 36.2 | 23.7 | 13.7 | 6.2 | 11.2 | 18.5 | 20.9 | 23.0 | 17.0 | 14.1 | 27.0 | nm |
| $HLMI/MI_2$ | 23 | 24 | 27 | 27 | 28 | 22 | 41 | 44 | 26 | 74 | 29 | 19 | |
| $M_w/M_n$ | 4.8 | 4.5 | 4.5 | 4.4 | 4.3 | 3.9 | 3.7 | 3.8 | 2.7 | 4 | 4.1 | 3 | 6 |
| $M_z/M_w$ | 2.8 | 2.7 | 2.8 | 2.8 | 2.7 | 2.6 | 2.5 | 2.5 | 2 | 2.5 | 2.8 | 2 | 2.8 |
| $M_z/M_n$ | 13.4 | 12.4 | 12.6 | 12.3 | 11.3 | 9.9 | | | | | | | |
| grheo | 0.83 | 0.93 | 0.88 | 0.80 | 0.72 | 0.91 | 0.69 | 0.69 | 0.81 | 0.54 | | 1 | 1 |
| Melt Strength (N) | 0.085 | 0.054 | 0.071 | 0.098 | 0.121 | 0.083 | 0.055 | 0.047 | 0.041 | 0.051 | 0.051 | 0.025 | 0.03 |
| claim equation (1) | 0.067 | 0.039 | 0.053 | 0.068 | 0.089 | 0.067 | 0.071 | 0.069 | 0.053 | 0.088 | 0.069 | 0.041 | 0.042 |
| claim equation (2) | 0.069 | 0.040 | 0.051 | 0.065 | 0.086 | 0.071 | 0.057 | 0.054 | 0.052 | 0.060 | 0.064 | 0.048 | | nm: not measured

TABLE 4

| Film properties | | Example 6 | Example 1 | Example 2 | Example 3 | Example 4 | Example 5 |
| --- | --- | --- | --- | --- | --- | --- | --- |
| Dart/Thickness | g/μm | 26.2 | 50.0 | 41.9 | 50.0 | 42.1 | 4.5 |
| Tear MD | N/mm | 67 | 72 | 74 | 69 | 50 | 53 |
| Tear TD | N/mm | 135 | 131 | 125 | 135 | 115 | 159 |
| Gloss @ 45° | | 59 | 71 | 68 | 62 | 46 | 57 |
| Haze_average | % | 7.5 | 4.9 | 5.6 | 7 | 10.3 | 8.8 |
| Thickness_average | μm | 43 | 44 | 41 | 39 | 42 | 38 |

The results show that the polyethylene resins according to the invention have a good balance of optical and mechanical properties.

The invention claimed is:

1. A polyethylene resin prepared using a continuous process and at least one metallocene catalyst, said polyethylene resin having:
   a molecular weight distribution $M_w/M_n$ lower than 6.5;
   a molecular weight distribution $M_w/M_n$ of at least 3.5;
   a melt index ranging from an HLMI of at least 1.20 g/10 min to an $MI_2$ of at most 6.0 g/10 min wherein $MI_2$ is determined according to ISO 1133:1997 at a temperature of 190° C. and under a load of 2.16 kg, and HLMI is determined according to ISO 1133:1997, at a temperature of 190° C. and under a load of 21.6 kg;
   a melt index ratio $HLMI/MI_2$ below or equal to 30; and
   a melt strength of X in Newtons, as determined by Göttfert Rheotens Melt Strength Apparatus, 190° C., as described in the Experimental section, satisfying the following equations (1) and/or (2):

$$X \text{ is greater than } -0.026 \ln(MI_2)+0.0498 \quad (1)$$

$$X \text{ is greater than } -0.026 \ln(HLMI)+0.1334 \quad (2)$$

with $M_w$ being the weight-average molecular weight and Mn being the number-average molecular weight.

2. The polyethylene resin according to claim 1, wherein the polyethylene resin has a molecular weight distribution $M_z/M_w$ lower than 3.5, with $M_z$ being the z average molecular weight.

3. The polyethylene resin according to claim 1, wherein the polyethylene resin has a molecular weight distribution $M_z/M_n$ of at least 8.0, with $M_z$ being the z average molecular weight and $M_n$ being the number-average molecular weight.

4. The polyethylene resin according to claim 1, wherein the polyethylene resin has a rheology long chain branching index $g_{rheo}$ of at least 0.50.

5. The polyethylene resin according to claim 1, wherein said polyethylene resin has a density of at least 0.900 g/cm³ as measured according to the method of standard ISO 1183-1:2012 method A at a temperature of 23° C.

6. The polyethylene resin according to claim 1, wherein said polyethylene resin has a density of most 0.964 g/cm³, as measured according to the method of standard ISO 1183-1:2012 method A at a temperature of 23° C.

7. The polyethylene resin according to claim 1, wherein said metallocene catalyst is a metallocene catalyst composition comprising a catalyst component A and a catalyst component B, wherein catalyst component A comprises a bridged metallocene compound with two groups independently selected from indenyl or tetrahydroindenyl, each group being unsubstituted or substituted; and catalyst component B comprises a bridged metallocene compound with a substituted or unsubstituted cyclopentadienyl group and a substituted or unsubstituted fluorenyl group.

8. The polyethylene resin according to claim 1, wherein said metallocene is a metallocene catalyst composition comprising a catalyst component A and a catalyst component B, wherein catalyst component A comprises a bridged metallocene compound with two tetrahydroindenyl groups, each group being unsubstituted or substituted; and catalyst component B comprises a bridged metallocene compound with a substituted or unsubstituted cyclopentadienyl group and a substituted or unsubstituted fluorenyl group.

9. The polyethylene resin according to claim 1, wherein said polyethylene resin is an alumoxane activated supported metallocene-catalyzed polyethylene resin.

10. The polyethylene resin according to claim 1, wherein said polyethylene resin is a copolymer of ethylene and a higher alpha-olefin co-monomer.

11. The polyethylene resin according to claim 1, wherein said polyethylene resin is a copolymer of ethylene and a higher alpha-olefin co-monomer and has a reverse co-monomer distribution as determined by GPC-IR.

12. An article comprising the polyethylene resin according to claim 1.

13. The article according to claim 12, wherein the article is a film, a cap and closure, a yarn, a rotomoulded article, blow moulded article, a pipe, a fiber.

14. A continuous process for the preparation of a polyethylene resin according to claim 1, the process comprising: contacting at least one metallocene catalyst composition, with ethylene, optionally hydrogen, and optionally one or more alpha-olefin co-monomers; and polymerizing the ethylene, and the optionally one or more alpha-olefin co-monomers, in the presence of the at least one metallocene catalyst composition, and optional hydrogen, thereby obtaining the polyethylene resin.

15. A process for preparing an article comprising a polyethylene resin, the process comprising a step of using the polyethylene resin of claim 1 in the preparation of the article, wherein said article is a film, a yarn, an injected article, a blow moulded article, a rotomoulded article, an extruded article, or a polyethylene of raised temperature resistance (PE-RT) article.

* * * * *